(12) United States Patent
Yoshida et al.

(10) Patent No.: US 6,879,771 B1
(45) Date of Patent: Apr. 12, 2005

(54) RECORDING TIMING SETTING APPARATUS AND INFORMATION RECORDING APPARATUS

(75) Inventors: Masayoshi Yoshida, Tokorozawa (JP); Yoshitaka Shimoda, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/472,504

(22) Filed: Dec. 27, 1999

(30) Foreign Application Priority Data

Dec. 28, 1998 (JP) .......................................... P10-374414

(51) Int. Cl.$^7$ .......................... H04N 5/781; H04N 5/932
(52) U.S. Cl. ................... 386/84; 369/47.14; 369/47.28; 386/125; 386/126
(58) Field of Search ........................... 369/47.28, 275.1, 369/275.2, 275.3, 278, 47.14; 386/125–126, 84; H04N 5/932

(56) References Cited

U.S. PATENT DOCUMENTS

| | | | |
|---|---|---|---|
| 5,062,091 A | 10/1991 | Maeda et al. .................. | 369/13 |
| 5,363,360 A | * 11/1994 | Fairchild ................. | 369/47.21 |
| 5,754,522 A | 5/1998 | Kobayashi et al. ...... | 369/275.3 |
| 5,835,461 A | 11/1998 | Kobayashi et al. ........... | 369/48 |
| 6,067,281 A | * 5/2000 | Kobayashi et al. ...... | 369/47.14 |
| 6,324,136 B1 | * 11/2001 | Yoshida et al. .......... | 369/47.28 |

FOREIGN PATENT DOCUMENTS

| | | |
|---|---|---|
| EP | 0 419 239 A2 | 3/1991 |
| EP | 0 813 198 A2 | 12/1997 |
| EP | 0 825 591 A2 | 2/1998 |
| EP | 0 871 169 A1 | 10/1998 |
| EP | 0 930 617 A2 | 7/1999 |
| EP | 0 962 930 A1 | 12/1999 |
| JP | 11-273249 | 10/1999 |

* cited by examiner

*Primary Examiner*—Vincent Boccio
*Assistant Examiner*—James A Fletcher
(74) *Attorney, Agent, or Firm*—Morgan, Lewis & Bockius LLP

(57) ABSTRACT

A recording timing setting apparatus for setting a recording start timing for recording first recording information onto a recording medium on which second recording information is previously recorded and on which a plurality of synchronization signals are recorded in advance. The second recording information includes a plurality of information units each including synchronization information. The recording timing setting apparatus includes: a first detecting device for detecting the plurality of synchronization signals; a second detecting device for detecting the synchronization information included in the second recording information; a generating device for generating a timing signal for predicting the detection timings of the plurality of synchronization signals, on the basis of the synchronization information detected by the second detecting device; and a timing control device for setting the recording start timing by using the timing signal.

13 Claims, 18 Drawing Sheets

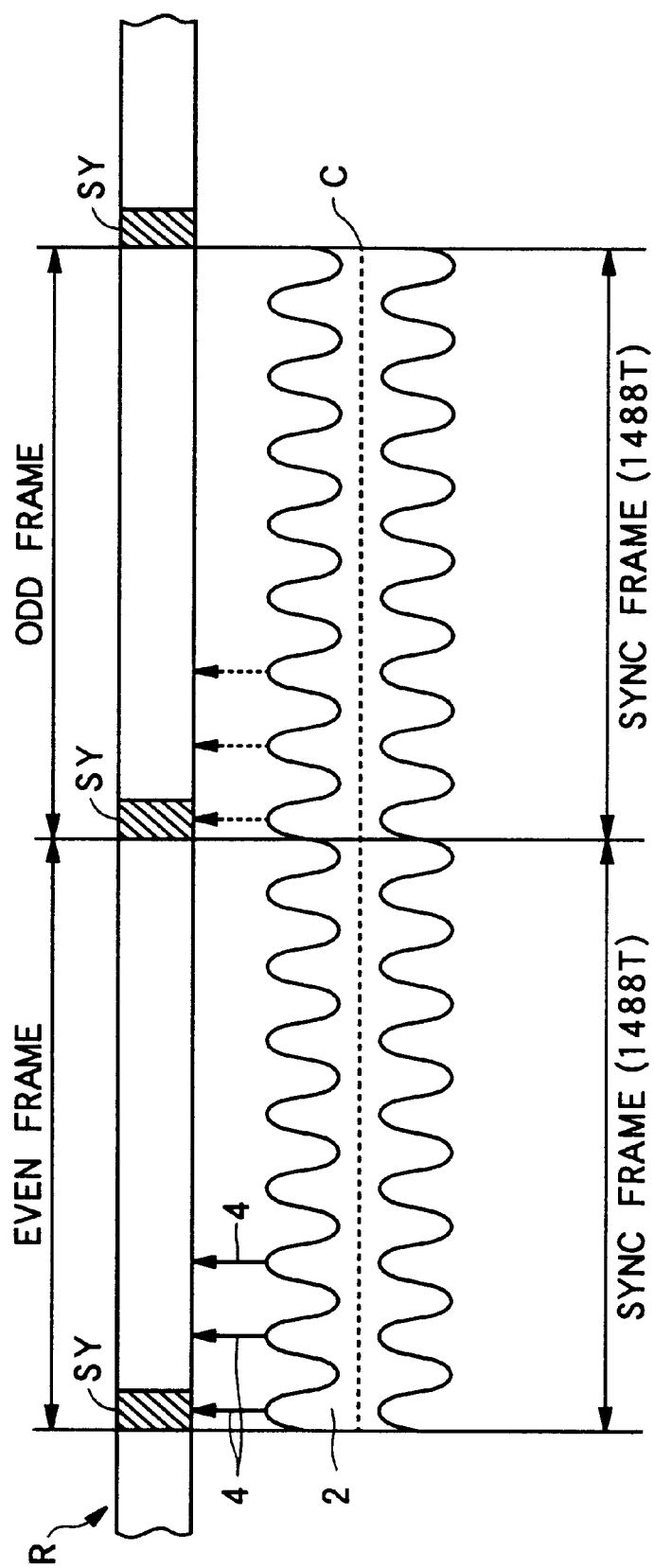

RECORDING TIMING SETTING APPARATUS AND INFORMATION RECORDING APPARATUS

BACKGROUND OF THE INVENTION

1. Field of the Invention

The present invention relates to a recording timing setting apparatus for setting recording timing (recording position) at the time of recording recording information in a recording medium such as an optical disk, and an information recording apparatus including the recording timing setting apparatus.

2. Description of the Related Art

Recently, a DVD-R/W having an improved recording density of as much as several times that of a CD-R (compact disk-recordable) as a conventional recordable optical disk has been developed. The DVD-R/W can record recording information many times. That is, recording information can be recorded in a portion on a DVD-R/W wherein recording information is not recorded (hereinafter referred to as "addition recording"), or other recording information can be overwritten in a portion on a DVD-R/W wherein recording information is already recorded (hereinafter referred to as "overwrite recording").

A plurality of pits are arranged on a DVD-R/W discretely (hereinafter referred to as "prepits"). The prepits are recorded on a DVD-R/W preliminarily in the state that no recording information is recorded. For example, in a conventional DVD-R/W, prepits are formed as phase pits on a land track adjacent to a groove track in which recording information is to be recorded.

Prepits are synchronization signals to be used for recording recording information in a DVD-R/W. That is, in recording the recording information on the DVD-R/W, an information recording apparatus generates a synchronization signal based on the prepits and generates a recording clock to be the standard for recording the recording information based on the synchronization signal as well as obtains address information showing the position on the DVD-R/W at which the recording information is to be recorded. The recording information is recorded in the DVD-R/W according to the recording clock and the address information.

The recording performance of the DVD-R/W can be improved by preliminarily recording the synchronization signal to be used for the record of the recording information in the DVD-R/W as prepits. That is, even if the rotation of the DVD-R/W is displaced from the steady rate due to disturbance, the frequency of a recording clock signal can be displaced corresponding to the displacement. Accordingly, a recording clock signal having a frequency always synchronous with the rotation of the DVD-R/W can be generated, and thus recording information can be recorded accurately.

However, at the time of executing addition recording, sometimes the synchronization signal cannot be generated accurately by inability of detecting prepits due to flaw or finger prints on the surface of the DVD-R/W. In this case, since generation of the recording clock signal is interrupted temporarily, recording information cannot be recorded accurately at the desired recording position.

On the other hand, at the time of overwrite recording of recording information, a signal including both signal corresponding to the prepits and signal corresponding to the recording information already recorded on the DVD-R/W is detected from the DVD-R/W. Therefore, it is difficult to detect only the signal corresponding to the prepits. As a result, the synchronization signal may not be detected accurately.

SUMMARY OF THE INVENTION

An object of the present invention is to provide a recording timing setting apparatus capable of setting accurate recording start timing.

Another object of the present invention is to provide a recording timing setting apparatus capable of realizing accurate overwrite recording.

A further object of the present invention is to provide an information recording apparatus capable of accurately recording recording information on a recording medium.

A recording timing setting apparatus in accordance with the present invention is an apparatus for setting a recording start timing for recording first recording information onto a recording medium on which second recording information is previously recorded. A plurality of synchronization signals are recorded in advance. The locations of the plurality of synchronization signals on the recording medium are predetermined. The second recording information includes a plurality of information units. Each of the plurality of information units includes synchronization information. The plurality of information units are placed in a plurality of recording areas on the recording medium, respectively. The plurality of recording areas correspond to the locations of the plurality of synchronization signals, respectively.

The recording timing setting apparatus includes: a first detecting device for detecting the plurality of synchronization signals and generating a detection signal indicating detection timings of the plurality of synchronization signals; a second detecting device for detecting the synchronization information included in the second recording information; a generating device for generating a timing signal for predicting the detection timings of the plurality of synchronization signals, on the basis of the synchronization information detected by the second detecting device; and a timing control device for setting the recording start timing by using the timing signal.

The recording timing setting apparatus sets the recording start timing on the basis of the synchronization information included in the second recording information which has been recorded on the recording medium. Therefore, if the detection of the synchronization signals is unstable, the accurate recording start,timing can be set.

In the recording timing setting apparatus, the generating device may include: a gate signal generating device for generating a gate signal for predicting the detection timings of the plurality of synchronization signals, on the basis of the synchronization information detected by the second detecting device; and a timing signal generating device for generating the timing signal by using the gate signal and the detection signal.

Since both the gate signal and the detection signal are used to generate the timing signal, the timing signal can be accurately generated. Therefore, the accuracy of the recording start timing can be increased.

In the recording timing setting apparatus, the gate signal generating device may generate the gate signal including a gate pulse, and the gate signal generating device may include: a counting device that serves as a counter; and a comparing device for comparing an output value of the counting device with a predetermined value. In this case, the output value of the counting device is initialized each time the synchronization information is detected, and the comparing device outputs the gate pulse when the output value of the counting device coincides with the predetermined value, so that the gate signal including the gate pulse is generated. Thus, the gate signal can be generated with such a simple structure. Therefore, the mechanism for setting the recording start timing can be made simple.

In the recording timing setting apparatus, it is preferable that the recording start timing is a recording start timing of an information block including a predetermined number of information units, in the case where the information block is a recording unit in the recording process for the recording medium.

In the recording timing setting apparatus, a DVD-R/W (DVD-Rewritable) may be used as the recording medium. In this case, each of the plurality of information units is a sync frame in the DVD-R/W, and the information block is an ECC block in the DVD-R/W.

The recording timing setting apparatus may be adapted for an information recording apparatus for recording the recording information in accordance with the recording start timing. For example, such an information recording apparatus can be realized by the combination of the above-stated recording timing setting apparatus, a reproduction device for reproducing the recording information from the recording medium and a recording device for recording the recording information onto the recording medium in accordance with the recording start timing.

A recording timing setting apparatus in accordance with another aspect of the present invention is an apparatus for setting a recording start timing for recording first recording information onto a recording medium on which a plurality of synchronization signals are recorded in advance. The locations of the plurality of synchronization signals on the recording medium are predetermined.

This recording timing setting apparatus includes an overwrite recording section for setting an overwrite recording start timing for recording the first recording information onto the recording medium on which second recording information is previously recorded; an addition recording section for setting an addition recording start timing for recording the first recording information onto the recording medium on which the second recording information is not recorded; and a selecting device for selecting one of the overwrite recording start timing and the addition recording start timing on the basis of whether or not the second recording information is previously recorded on the recording medium. The second recording information includes a plurality of information units. Each of the plurality of information units includes synchronization information. When the second recording information is recorded on the recording medium, the plurality of information units are placed in a plurality of recording areas on the recording medium, respectively. The plurality of recording areas correspond to the locations of the plurality of synchronization signals, respectively.

The addition recording section includes: a first detecting device for detecting the plurality of synchronization signals and generating a detection signal indicating detection timings of the plurality of synchronization signals; a first generating device for generating a first timing signal on the basis of the detection signal; and a first timing control device for setting the addition recording start timing by using the first timing signal.

The overwrite recording section includes: a second detecting device for detecting the synchronization information included in the second recording information; a second generating device for generating a second timing signal for predicting the detection timings of the plurality of synchronization signals, on the basis of the synchronization information detected by the second detecting device; and a second timing control device for setting the overwrite recording start timing by using the second timing signal.

The recording timing setting apparatus selects either one of the addition recording start timing and the overwrite recording start timing on the basis of whether or not the second recording information is previously recorded on the recording medium. The addition recording start timing is selected when the second recording information is not recorded on the recording medium. The addition recording start timing is generated on the basis of the synchronization signal. On the other hand, the overwrite recording start timing is selected when the second recording information is previously recorded on the recording medium. The overwrite recording start timing is generated on the basis of the synchronization information included in the second recording information.

As stated above, in the case where the recording information is recorded onto the recording information on which another recording information has been already recorded, there is the case where the detection of the synchronization signals becomes unstable. In this case, the overwrite recording start timing generated on the basis of the synchronization information is used. Therefore, the accurate recording start timing can be set, if the detection of the synchronization signals is unstable.

In the recording timing setting apparatus, the first generating device may includes: a specific synchronization signal detecting device for detecting from the detection signal a specific synchronization signal which is one of the plurality of synchronization signals; and a timing prediction device for predicting the detection timings of the plurality of synchronization signals, on the basis of the specific synchronization signal detected by the specific synchronization signal detecting device.

In the case where the recording information is recorded onto the recording information on which another recording information is not recorded, the detection of the synchronization signals is relatively stable. However, if a noise occurs, there is a case where the stability of the detection of the synchronization signals is reduced. In this case, the timing prediction device predicts the detection timings of the plurality of synchronization signals, on the basis of the specific synchronization signal detected by the specific synchronization signal detecting device. Therefore, the accuracy of the recording start timing can be maintained.

In the recording timing setting apparatus, the selecting device may include a third detecting device for detecting whether or not the second recording information is previously recorded on the recording medium.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a chart showing the recording format in the DVD-R/W of an embodiment of the present invention;

DETAILED DESCRIPTION OF THE PREFERRED EMBODIMENTS

Hereinafter embodiments of the present invention will be explained with reference to the drawings. In the following description, cases with the present invention adopted in an information recording apparatus for recording recording information in a DVD-R/W as a recording medium with a plurality of prepits and wobbles preliminarily recorded and formed will be explained.

1. DVD-R/W

Figure 1A:
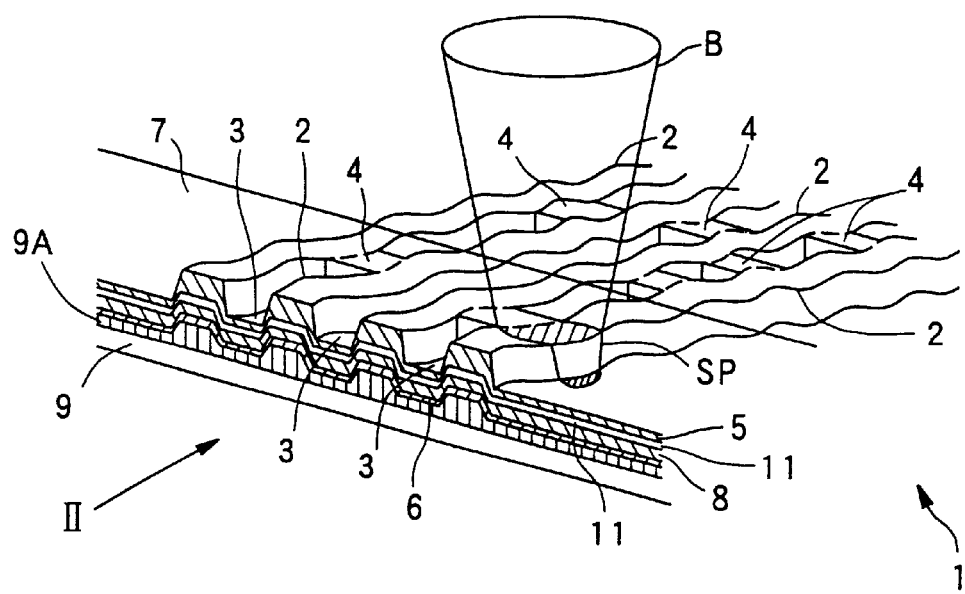
FIG. 1A is a perspective view showing the structure of a DVD-R/W with prepits formed in a land track.

A DVD-R/W1 in this embodiment will be explained with reference to FIGS. 1A, 1B and 2. In the DVD-R/W1, prepits corresponding to preinformation are formed preliminarily. Furthermore, wobbles having a predetermined frequency are formed preliminarily in a groove track of the DVD-R/W1. FIG. 1A is a cross-section perspective view of a DVD-R/W of this embodiment, FIG. 1B is a cross-sectional view of a groove track viewed from the arrow 11 direction of the cross-section perspective view, and FIG. 2 is a chart showing the recording format of preinformation and rotation control information preliminarily recorded in the DVD-R/W.

The physical structure of the DVD-R/W according to this embodiment will be explained with reference to FIGS. 1A and 1B.

Figure 1B:
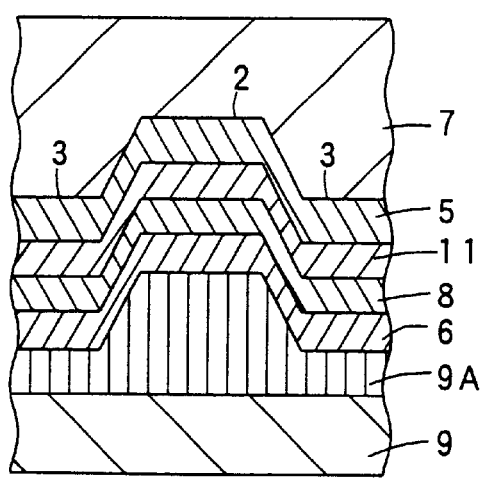
FIG. 1B is a cross-sectional view viewed from the arrow II direction of FIG. 1A.

In FIGS. 1A and 1B, the DVD-R/W1 is a phase change type DVD-R/W comprising a recording layer 11 made of a phase change membrane, as a recording medium capable of writing information for a plurality of times. A groove track 2 and a land track 3 are formed on the substrate 9 of the DVD-R/W1. Recording information is recorded in the groove track 2 by a recording information apparatus S described later. The land track 3 is a track for guiding an optical beam B such as a laser beam as the reproduction light or the recording light to the groove track 2.

Moreover, as shown in FIG. 1B, dielectric layers 5 and 8 disposed with a recording layer 11 interposed therebetween for protecting the recording layer 11, a gold deposition surface 6 for reflecting the light beam B at the time of reproducing the recorded recording information, a resin layer 9A and a protection film 7 for protecting the recording layer 11, the dielectric layers 5 and 8 and the gold deposition surface 6 from the outside air are laminated on the substrate 9.

On the other hand, prepits 4 corresponding to preinformation are formed on the land track 3. The prepits 4 are formed preliminarily before shipping the DVD-R/W1.

Furthermore, wobbles are formed on the groove track 2 of the DVD-R/W1. The wobbles have a frequency corresponding to the rotation rate of the DVD-R/W1. Similar to the prepits 4, the wobbles are formed preliminarily before shipping the DVD-R/W1.

In recording recording information in the DVD-R/W1, the information recording apparatus S controls the DVD-R/W1 at a predetermined rotation rate by detecting the frequency of the wobbles in the groove track 2. Moreover, the information recording apparatus S obtains the preinformation by detecting the prepits 4, and sets the optimum output or the like, of the light beam B as the recording light based thereon. Furthermore, the information recording apparatus S obtains the address information indicating the position on the DVD-R/W1 for recording the recording information or the like, from the preinformation, and records the recording information at the position indicated by the address information. The recording information denotes the information other than the preinformation and the wobbles to be recorded originally, including, for example, image information.

In recording the recording information, the light beam B is directed such that the center thereon coincides with the center of the groove track 2. Thereby, phase change pits corresponding to the recording information are formed on the groove track 2. Accordingly, the recording information is recorded on the groove track 2. At the same time, as shown in FIG. 1A, the size of the light spot SP is set such that it is directed not only to the groove track 2 but also to the land track 3 partially. By utilizing the reflected light of the part of the light spot SP directed to the land track 3, the preinformation is detected from the prepits 4. Furthermore, by utilizing the reflected light of the light spot SP directed to the groove track 2, a wobble signal is detected from the groove track 2 so as to obtain a clock signal for rotation control. The push-pull method is used for detection thereof. For example, the radial push-pull method using a light detector divided by dividing lines parallel to the rotation direction of the DVD-R/W1 can be used for detection thereof.

The recording format of the preinformation and the rotation control information preliminarily recorded in the DVD-R/W1 according to this embodiment will be explained with reference to FIG. 2. In FIG. 2, the upper row denotes the recording format of recording information. The wave-like waveform in the lower row represents the wobble state of the groove track.2 for recording the recording information (that is, plan view of the groove track 2). The upward arrows between the recording information and the wobble state of the groove track 2 represents the positions at which the prepits 4 are formed. In FIG. 2, the wobble state of the groove track 2 is shown with an amplitude larger than the actual amplitude for facilitating understanding. The recording information is recorded by forming phase change pits on the center line C of the groove track 2.

As shown in FIG. 2, the recording information to be recorded in the DVD-R/W1 in this embodiment is divided in a plurality of sync frames. Moreover, 26 sync frames comprise a recording sector, and further, 16 recording sectors comprise an ECC block.

A sync frame has a length 1,488 times (1,488T) as long as the unit length (hereinafter referred to as T) corresponding to the bit interval defined by the recording format at the time of recording recording information. Furthermore, synchronization information SY for synchronization at the time of recording per sync frame is recorded at the top of each sync frame. The synchronization information SY is disposed at a region having a 14T length from the top of each sync frame.

The preinformation is recorded corresponding to the sync frame. As mentioned above, the preinformation is recorded preliminarily on the land track 3 as the prepits 4, and the sync frame (recording information) is recorded on the groove track 2 by the information recording apparatus S. When the recording information is recorded in the DVD-R/W1, the sync frames and the prepits 4 adjacent with each other have the positional relationship as shown in FIG. 2. That is, the arrangement of the prepits 4 and the length of the sync frames are determined preliminarily so as to have the positional relationship.

The positional relationship between the sync frames and the prepits 4 will be explained more specifically. In principle, one prepit is always disposed at a position at which the synchronization information SY of a sync frame is recorded. Furthermore, one or two prepits are disposed subsequent to the prepit 4 disposed corresponding to the position of the synchronization information SY after a short interval. The series of the prepits 4 disposed after the short interval are address information indicating the position on the DVD-R/W1. Depending on the content of the address information, no prepit 4 may be disposed subsequent to the prepit 4 disposed corresponding to the position of the synchronization information SY.

Furthermore, a shown in FIG. 2, as to the sync frame positioned at the top of each recording sector, always two prepits 4 are disposed subsequent to the prepit 4 disposed corresponding to the position of the synchronization information SY. That is, three prepits 4 are always disposed successively at the position corresponding to the top of each recording sector.

Moreover, in this embodiment, prepits 4 are disposed adjacent with each other only in the sync frames of even numbers from the top of the recording sector (EVEN frame), but prepits 4 are not disposed in the sync frames of odd numbers from the top of the recording sector (ODD frame). The prepits 4 may be formed corresponding only to the odd-numbered frames or the even-numbered frames in a recording sector as mentioned above, or the prepits 4 may be formed corresponding to all the sync frames. In FIG. 2, the solid upward arrows denote the actual arrangement of the prepits 4. On the other hand, the dot upward arrows denote absence of the prepits 4 as well as the positions of the prepits 4 in the case they are provided.

Furthermore, the wobbles and the prepits 4 formed in the groove track 2 have a predetermined positional relationship. The prepits 4 are formed always at a position at which the wobbles can have the maximum amplitude.

Moreover, the frequency of the wobbles (hereinafter referred to as "wobble frequency") in this embodiment is constant over all the sync frames. For example, it is 140 kHz.

As a result, as shown in FIG. 2, the length 8 times as much as the wavelength of the wobbles is identical with the length of a sync frame. The information recording apparatus S controls the rotation of the spindle motor for rotating the DVD-R/W1 by detecting the wobble frequency.

2. Information Recording Apparatus

The information recording apparatus S will be explained with reference to FIGS. 3 to 17. The information recording apparatus S is an apparatus for recording recording information in the DVD-R/W1. The information recording apparatus S can execute the process of overwriting other information on a DVD-R/W1 wherein recording information is already recorded (overwrite recording) and a process of adding and recording recording information on a DVD-R/W1 wherein recording information is not recorded (addition recording). That is, the overwrite recording denotes a process of recording other recording information on a portion of the DVD-R/W1 at which recording information is already recorded. In this case, the recording information already recorded is erased consequently. On the other hand, the addition recording denotes a process of recording recording information newly or in addition on a portion of the DVD-R/W1 at which recording information is not recorded.

Figure 3:
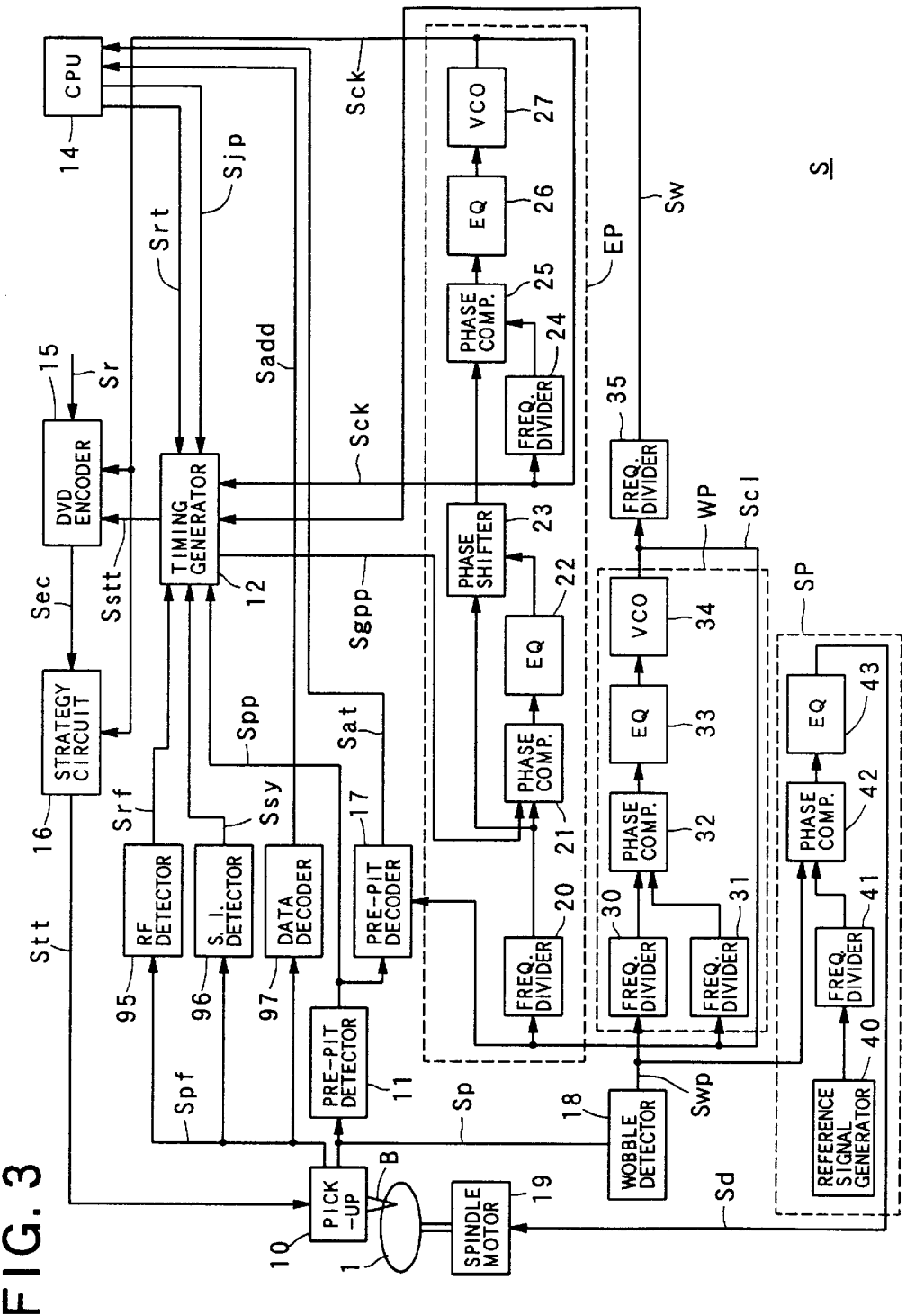
FIG. 3 is a block diagram showing the configuration of an information recording apparatus of the embodiment.

First, the entire configuration of the information recording apparatus according to this embodiment will be explained with reference to FIG. 3. FIG. 3 is a block diagram showing the outlined configuration of the information recording apparatus according to this embodiment. FIG. 3 is a block diagram showing only the portion of the information recording apparatus related to the present invention. That is, in addition to the content of the block diagram shown in FIG. 3, the actual information recording apparatus further comprises servo control systems each for tracking servo control (in the information recording apparatus according to this embodiment, the tracking servo control of the three beams method is used) and the focus servo control (in the information recording apparatus, the focus servo control of the astigmatism method is used), and the rotation control of the spindle motor described later, a display section for displaying the operation state of the information recording apparatus, an operation section for designating the operation of the information recording apparatus from the outside and the like.

As shown in FIG. 3, the information recording apparatus S comprises a pickup 10, a prepit detector 11, a timing generator 12, a CPU 14, a DVD encoder 15, a strategy circuit 16, a prepit decoder 17, a wobble detector 18, a spindle motor 19, a frequency divider 35, an RF detector 95, a synchronization information detector 96 (SI detector 96), a data decoder 97, a phase modulation section EP, a wobble PLL (phase locked loop) section WP, and a spindle control section SP.

The pickup 10 includes a laser diode for generating and outputting a light beam B, an objective lens for collecting the outputted light beam B on the DVD-R/W1, a cylindrical lens for providing astigmatism to the reflected light of the light beam B from the DVD-R/W1 for the focus servo control of the astigmatism method, a detector for receiving the reflected light so as to generate a detection RF signal Spf and a detection signal Sp described later, an actuator for moving the collecting position of the light beam B in the radial direction of the DVD-R/W1 for the tracking servo control as well as moving the objective lens in the radial direction of the perpendicular direction for the focus servo control by the movement in the direction perpendicular to the information recording surface and the like (they are not illustrated).

Moreover, the information recording apparatus S executes the focus servo control using the astigmatism method and the tracking servo control using the three beams method. The detector of the pickup 10 to be used for the controls has the following configuration. That is, the detector comprises one main detector and two sub detectors (not illustrated). The main detector comprises four sector-formed detecting members adjacent with each other via dividing lines parallel in the radial direction of the DVD-R/W1 as well as adjacent with each other via dividing lines parallel in the circumferential direction of the DVD-R/W1. The sub detector receives the reflected lights of two sub beams (not illustrated) for the tracking servo control and generates a tracking error signal for the tracking servo control of the three beams method. The sub beams are directed before and after the collecting position of the light beam B shown in FIG. 1A on the DVD-R/W1 with a certain interval in the circumferential direction of the DVD-R/W1, respectively (not illustrated).

The detection RF signal Spf, the detection signal Sp and the focus error signal for the focus servo control are generated based on the total four light receiving signals outputted each from the detecting members of the main detector subject to the receipt of the reflected light of the light beam B. Furthermore, a tracking error signal for the tracking servo control is generated based on two light receiving signals outputted each from the sub detectors subject to the receipt of the reflected light beam of each sub beam.

The phase modulation section EP comprises frequency dividers 20 and 24, phase comparators 21 and 25, equalizers (EQ) 22 and 26, a phase shifter 23, and a VCO (voltage controlled oscillator) 27.

The wobble PLL section WP comprises frequency dividers 30 and 31, a phase comparator 32, an equalizer 33, and a VCO 34.

The spindle control section SP comprises a reference signal generator 40, a frequency divider 41, a phase comparator 42, and an equalizer 43.

Next, the entire operation of the information recording apparatus S will be explained.

In executing the overwrite recording or the addition recording, the recording information to be recorded in the DVD-R/W1 is inputted to the information recording apparatus S as the recording data Sr from the outside. First, a recording data Sr are inputted to the DVD encoder 15 under the control of a recording starting signal Sstt. At the time, the recording starting signal Sstt determines the timing of inputting the recording data Sr to be provided at the top of the ECC block into the DVD encoder 15. Then, the DVD encoder 15 applies the 8/16 modulation to the recording data Sr under the control of a clock signal Sck and the recording starting signal Sstt. At the time, an ECC block comprising the recording data Sr is formed in the DVD encoder 15. The recording data Sr applied with the 8/16 modulation is outputted to the strategy circuit 16 as a modulation signal Sec.

The strategy circuit 16 applies the waveform conversion to the modulation signal Sec for adjusting the recording pit shape to be formed on the DVD-R/W1. The modulation signal applied with the waveform conversion is supplied to the pickup 10 as a recording signal Srr.

The pickup 10 directs the light beam B applied with the strength modulation by the recording signal Srr onto the groove track 2. As a result, a phase change pit corresponding to the recording data Sr is formed and the recording information is recorded on the DVD-R/W1.

Before actually executing the overwrite recording or the addition recording, the information recording apparatus S executes specification of the address on the DVD-R/W1 for recording the recording data Sr, generation of the clock signals Scl and Sck, generation of the recording starting signal Sstt, the control of the rotational frequency of the spindle motor 19 and the like as follows.

Prior to recording of the recording data Sr, the pickup 10 directs the light beam B to the DVD-R/W1 (see FIG. 1A). Furthermore, the pickup 10 receives the reflected light of the light beam B modulated by the prepits 4 and the wobbles, generates a detection signal Sp including the information of the prepits 4 and the wobbles, and outputs the same to the prepit detector 11 and the wobble detector 18.

The prepit detector 11 extracts a signal corresponding to the prepits 4 from the detection signal Sp by the radial push-pull method, and outputs the same to the timing generator 12 and the prepit decoder 17 as a prepit signal Spp.

The prepit decoder 17 decodes the inputted prepit signal Spp based on the clock signal Scl, generates an address signal Sat indicating the region on the DVD-R/W1 for recording one ECC block, and outputs the same to the CPU 14.

In the case of the overwrite recording, the RF detector 95 generates a reproduction RF signal Srf corresponding to the recording information already recorded on the DVD-R/W1 based on the detection RF signal Spf outputted from the pickup 10, and outputs the same to the timing generator 12.

In the case of the overwrite recording, the synchronization information detector 96 detects synchronization information SY (see FIG. 2) of the recording information already recorded on the DVD-R/W1 based on the detection RF signal Spf, and generates a sync signal Ssy. The sync signal Ssy is a signal to be changed from "LOW" to "HIGH" at the timing when detection of the synchronization information SY is finished in each sync frame. The sync signal Ssy is outputted to the timing generator 12.

Furthermore, in executing the overwrite recording, the data decoder 97 generates an address signal Sadd including the reproduction address signal indicating the position on the DVD-R/W1 at which the recording information included in the detection RF signal Spf (the recording information already recorded) based on the detection RF signal Spf, and outputs the same to the CPU 14.

In executing the overwrite recording, the timing generator 12 generates a recording starting signal Sstt indicating the timing of starting recording of the ECC block comprising the recording data Sr to be recorded, using the inputted reproduction RF signal Srf, the sync signal Ssy, the prepit signal Spp, a wobble signal Sw (described later), the clock signal Sck, a designation signal Srt (described later) and a jump signal Sjp (described later), and outputs the same to the DVD encoder.

On the other hand, in executing the addition recording the timing generator 12 generates a recording starting signal Sstt, using the prepit signal Spp, the wobble signal Sw, the clock signal Sck, the designation signal Srt, and the jump signal Sjp because the recording data Sr is recorded in the unrecorded portion in the case of the addition recording, the reproduction RF signal Srf and the sync signal Ssy are not detected from the portion.

The designation signal Srt is a signal for designating recording of the recording data Sr. That is, the designation signal Srt is a signal to be outputted by the CPU 14 for designating the timing for starting the overwrite recording or the addition recording of the recording information with reference to the region on the DVD-R/W1 for recording the ECC block obtained by the address signal Sat when the CPU 14 detects the command of recording the recording data Sr by the user by the operation of the operation section of the information recording apparatus S.

The jump signal Sjp is a signal for indicating jump of the pickup 10. That is, the jump signal Sjp is a signal to be outputted when the irradiation position of the light beam B in the pickup 10 is moved, for example, in the radial direction of the DVD-R/W1 according to, for example, operation of the user of the operation section of the information recording apparatus S for commanding the recording position of the information data Sr on the DVD-R/W1. At the time of track jump, the phase of the clock signal Sck and the phase of the reference signal outputted from the reference signal generator 40 are displaced. As a result, the recording data Sr cannot e recorded with the accurate recording position set. Therefore, the jump signal Sjp is outputted from the CPU 14 to the timing generator 12 so that the timing generator 12 can recognize the state of inability in the accurate recording. The reference signal outputted from the reference signal generator 40 can also serve as the reference signal for the rotation control of the spindle motor 19. Hereinafter the state of inability in recording the recording data Sr with the accurate recording position set due to displacement of the phase of the clock signal Sck and the phase of the reference signal outputted from the reference signal generator 40 is referred to as the "unlocked state". Further, the state of synchronization of the phase of the clock signal Sck and the phase of the reference signal outputted from the reference signal generator 40 is established as well as the synchronization thereof is stable is referred to as the "locked state". For example, when the track jump is executed, it is in the unlocked state, and after passage of a certain time from the end of the track jump, it is in the locked state. The recording data Sr is recorded in the locked state. Moreover, other than the execution of the track jump, it may be in the unlocked state due to flow on the DVD-R/W1 or the like.

Furthermore, at the time of the overwrite recording process, the timing generator 12 outputs an extraction push-pull signal Sgtp (described later) generated in the inside based on the push-pull signal Spp or the like as a gate push-pull signal Sgpp to one of the terminals of the phase comparator 21 in the phase modulation section EP. Moreover, at the time of the addition recording process, the timing generator 12 outputs the push-pull signal Spp to one of the terminals of the phase comparator 21 as it is as the gate push-pull signal Sgpp. The gate push-pull signal Sgpp is outputted to the phase comparator 21 as a signal more accurately corresponding to the prepits 4 in either of the overwrite recording process and the addition recording process.

On the other hand, the wobble detector 18 with the detection signal Sp inputted generates a wobble detection signal Swp corresponding to the wobbles of the groove track 2 from the detection signal Sp, and outputs the same to the frequency divider 30 in the wobble PLL section WP and the phase comparator 42 in the spindle control section SP.

The wobble PLL section WP with the wobble detection signal Swp inputted generates a clock signal Scl having a frequency synchronous with the wobble frequency of the groove track 2 based on the wobble detection signal Swp, and outputs the same to the frequency divider 35 and the prepit decoder 17 as well as to the frequency divider 31 for feedback. Therefore, the wobble PLL section WP compares the signal provided by dividing the wobble detection signal Swp by the frequency divider 30 and the signal provided by dividing the clock signal Scl by the frequency divider 31 by the phase comparator 32, drives the VCO 34 using the signal provided by frequency correction of the comparison result by the equalizer 33, and generates the clock signal Scl.

Moreover, the frequency divider 35 again divides the clock signal Scl, generates a wobble signal Sw corresponding to the wobble frequency, and outputs the same to the timing generator 12.

Furthermore, the phase modulation section EP with the gate prepit signal Sgpp and the clock signal Scl inputted generates the clock signal Sck (the cycle thereof is the above-mentioned T) to be the reference clock in recording the recording data Sr based on these signals, outputs the same to the DVD encoder 15, the strategy circuit 16 and the timing generator 12 as well as to the frequency divider 24 for feedback. Therefore, the phase modulation sector EP first compares the phases of the signal provided by dividing the clock signal Scl by the frequency divider 20 and the gate prepit signal Sgpp by the phase comparator 21, then, shifts the phase of the signal provided by dividing the clock signal Scl by the frequency divider 20 using the signal provided by frequency correction of the comparison result by the equalizer 22 by the phase shifter 33, compares the phases of the phase-shifted signal and the signal provided by dividing the clock signal Sck by the frequency divider 24 by the phase comparator 25, and finally drives the VCO 27 using the signal provided by frequency correction of the comparison result by the equalizer 26 so as to generate the clock signal Sck.

On the other hand, the spindle control section Sp with the wobble detection signal Swp inputted generates a driving signal Sd for driving the spindle motor 19 while controlling the rotational frequency thereof based on the wobble detection signal Swp, and outputs the same to the spindle motor 19. Therefore, the spindle control section SP divides the reference signal outputted form the reference signal generator 40 for driving the spindle motor 19 by the frequency divider 41, compares the phases of the division result and the wobble detection signal Swp by the phase comparator 42, and corrects the frequency characteristic of the comparison result by the equalizer 43 so as to generate the driving signal Sd.

3. Timing Generator

Figure 4:
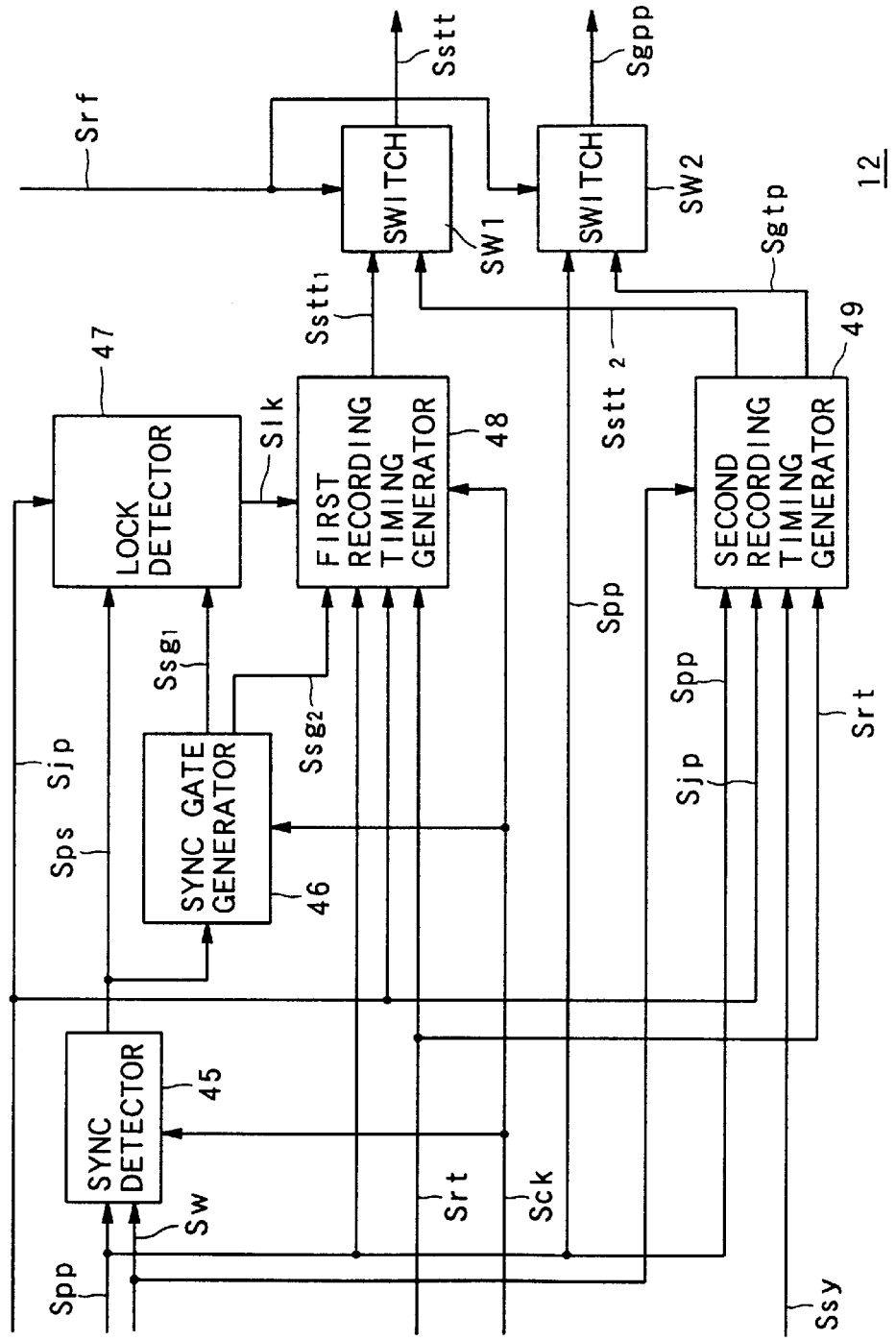
FIG. 4 is a block diagram showing the configuration of a timing generator.

The configuration and the operation of the timing generator 12 will be explained with reference to FIGS. 4 to 17. First, the entire configuration of the timing generator 12 will be explained with reference to FIG. 4. FIG. 4 is a block diagram showing the entire configuration of the timing generator 12.

The timing generator 12 is a device for predicting and setting the recording starting timing of the recording data Sr. More specifically, the timing generator 12 is a device for generating the recording starting signal Sstt to be supplied to the DVD encoder 15. The operation of predicting and setting the recording starting timing by the timing generator 12 differs in the case of executing the addition recording and the case of executing the overwrite recording as follows.

In the case of the addition recording, the timing generator 12 detects the prepit indicating the top of the recording sector. Furthermore, the timing generator 12 determines the locked state before the recording starting timing of the recording data Sr is predicted and set based on the detection timing of the prepit indicating the top of the recording sector. In the process, detection of the prepit indicating the top of the recording sector is realized by detecting the three prepits disposed consecutively with a short interval. This is executed using mainly the prepit signal Spp supplied from the prepit detector 11. Furthermore, determination of the locked state is realized by detecting displacement of the input timing among the inputted signals after passage of a predetermined setting period from the time when the track jump is finished, and judging whether or not the displacement is dissolved. The time when the track jump is finished can be detected based on the jump signal Sjp.

On the other hand, in the case of the overwrite recording, the timing generator 12 detects the synchronization information SY included in the recording information already recorded on the DVD-R/W1, predicts and sets the recording starting timing of the recording data Sr based thereon. In the process, detection of the synchronization information SY is executed using mainly the sync signal Ssy.

As mentioned above, the timing generator 12 predicts and sets the recording starting timing based on the detection timing of the prepit indicating the top of the recording sector in the case of executing the addition recording, and predicts and sets the recording starting timing based on the synchronization information SY included in the recording information already recorded in the case of executing the overwrite recording.

As shown in FIG. 4, the timing generator 12 comprises a sync detector 45, a sync gate generator 46, a lock detector 47, a first recording timing generator 48, a second timing generator 49, a switch SW1 and a switch SW2.

The sync detector 45 is a device for detecting the prepit signal Spp corresponding to the top of the recording sector from the prepit signal using a prepit signal Spp, a wobble signal Sw and a clock signal Sck, and outputs a detection sync signal Sps.

The sync gate generator 46 is a device for generating a sync gate signal Ssg1 to be used for detecting whether or not it is in the unlocked state and generating a sync gate signal Ssg2 to be used for predicting and setting the recording starting timing of the recording data Sr in the first recording timing generator 48 based on the detection sync signal Sps and the clock signal Sck.

The lock detector 47 is a device for generating a lock signal Slk indicating whether or not it is in the locked state wherein the accurate recording is enabled using the jump signal Sjp, the detection sync signal Sps and the sync gate signal Ssg1.

The first recording timing generator 48 is a device for generating a first starting signal Sstt1 for setting the recording starting timing of the recording data Sr at the time of executing the addition. recording using the sync gate signal Ssg2, the prepit signal Spp, the lock signal Slk, the address signal Sat, the clock signal Sck and the designation signal Srt.

The second recording timing generator 49 is a device for generating a second starting signal Sstt2 for setting the recording starting timing of the recording data Sr at the time of executing the overwrite recording using the prepit signal Spp, the wobble signal Sw, the jump signal Sjp, the sync signal Ssy and the designation signal Srt. Moreover, the second recording timing generator 49 also has a function of generating an extraction push-pull signal Sgtp.

The switch SW1 is selection means for determining which of a first recording starting signal Sstt1 and a second recording starting signal Sstt2 is outputted to the DVD encoder 15 as the recording starting signal Sstt. That is, the switch SW1 outputs the second recording starting signal Sstt2 as the recording starting signal Sstt in the case of executing the overwrite recording, and outputs the first recording starting signal Sstt1 as the recording starting signal Sstt in the case of executing the addition recording. Whether it is the addition recording or the overwrite recording is determined by whether or not the reproduction RF signal Srf is detected from the DVD-R/W1. That is, the reproduction RF signal Srf is detected from the DVD-R/W1 at the time of executing the overwrite recording, whereas it is not detected at the time of executing the addition recording. The switch SW1 determines whether it is the addition recording or the overwrite recording by the detection.

The switch SW2 is selection means for determining whether the extraction push-pull signal Sgtp is outputted to the phase comparator 21 as the gate push-pull signal Sgpp, or the push-pull signal Spp is outputted to the phase comparator 21 as it is as the gate push-pull signal Sgpp. That is, the switch SW2 outputs the extraction push-pull signal Sgtp as the gate push-pull signal Sgpp at the time of executing the overwrite recording, and outputs the push-pull signal Spp as it is as the gate push-pull signal Sgpp at the time of executing the addition recording. Similar to the switch SW1, whether it is the addition recording or the overwrite recording is determined by whether or not the reproduction RF signal Srf is detected from the DVD-R/W1.

Here, according to the operation of the switch SW1, the operation of the sync detector 45, the sync gate generator 46, the lock detector 47 and the first recording timing generator 48 among the above-mentioned configuration becomes effective in the overwrite recording process as well as the operation of the second recording timing generator 49 among the above-mentioned configuration becomes effective in the addition recording process.

The entire operation of the timing generator 12 mainly at the time of the addition recording will be explained with reference to a timing chart of FIG. 5. The operation shown in FIG. 5 is the entire operation in the addition recording until the first starting signal Sstt1.

Figure 5:
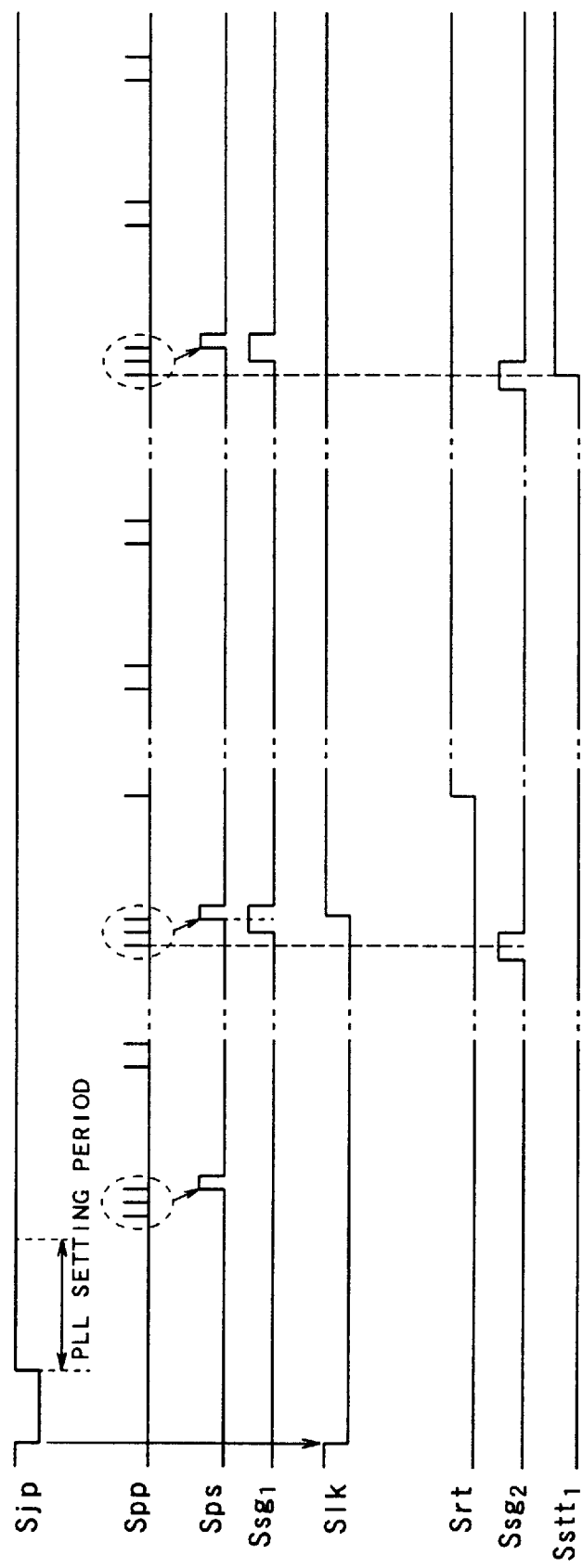
FIG. 5 is a timing chart showing the operation of the timing generator.

As shown in the uppermost row of FIG. 5, the jump signal Sjp is "LOW" during the track jump, and "HIGH" in other times. When a predetermined setting period from the timing when the jump signal Sjp becomes "HIGH" until the normal clock signal Sck is generated preliminarily set is passed, the prepits 4 are detected normally. As a result, the prepit signal Spp shown in the second row from above in FIG. 5 is started to be inputted to the sync detector 45. When the input of the prepit signal Spp is started, the sync detector 45 detects the prepit 4 indicating the top of one recording sector based on the prepit signal Spp. Detection of the prepit 4 indicating the top of the recording sector is realized by detecting the three prepits 4 disposed consecutively with a short interval. Then, the sync detector 45 generates a detection sync signal Sps (third row from above in FIG. 5) as the pulse signal for indicating detection of the prepit signal Spp.

Then, the lock detector 47 examines the time relationship between the detection sync signal Sps and the sync gate signal Ssg1 after the jump signal Sjp is changed to "HIGH". That is, as shown in the third and fourth rows from above in FIG. 5, the lock detector 47 detects the rising timing of the detection sync signal Sps coincides with the substantially middle timing of the period wherein the sync gate signal Ssg1 is "HIGH", and then determines whether or not the coincidence of the timings continues for predetermined times (for example, two times and more). In the case the coincidence of the timings continued for the predetermined times, the lock detector 47 judges that it is in the lock state wherein the accurate recording is enabled, and generates and outputs the lock signal Slk to the first recording timing generator 48. As a result, as shown in the fifth row from above in FIG. 5, the lock signal Slk changes to "LOW" when the jump signal Sjp becomes "LOW" based on the judgment that the locked state is released, and again changes to "HIGH" when the time relationship between the detection sync signal Sps and the sync gate signal Ssg1 is detected for predetermined times in the relationship shown in the third and fourth rows from above in FIG. 5 based on the judgment that the locked state is regained.

On the other hand, the sync gate generator 46 generates a sync gate signal Ssg1 for detecting whether or not it is in the locked state and a sync gate signal Ssg2 for predicting and setting the recording starting timing of the recording data Sr based on the detection sync signal Sps and the clock signal Sck, and outputs the same to the lock detector 47 and the first recording timing generator 48, respectively.

Here, as shown in the fourth row from above in FIG. 5, the sync gate signal Ssg1 is a gate signal generated based on the detection sync signal Sps generated in the past such that the rising timing of the detection signal Sps substantially coincides with the middle timing of the "HIGH" period of the sync gate signal Ssg1 in the case one detection sync signal Sps is generated normally.

Moreover, as shown in the second row from below in FIG. 5, the sync gate signal Ssg2 is a gate signal generated based on the detection sync signal Sps generated in the past such that the detection timing of the to prepit 4 substantially coincides with the middle timing of the "HIGH" period of the sync gate signal Ssg2 in the case the three prepits 4 disposed at the top of the recording sector are detected normally.

The first recording timing generator 48 generates the first starting signal Sstt1 and outputs the same to one of the input terminals of the switch SW1 using the sync gate signal Ssg2, the prepit signal Spp, the lock signal Slk, the clock signal Sck and the designation signal Srt when it is in the locked state. As shown in the third row from below in FIG. 5, the designation signal Srt is a signal to be changed from "LOW" to "HIGH" prior to the timing corresponding to the recording position on the DVD-R/W1 for starting recording of the recording data Sr for the addition recording judged by the CPU 14 based on the address signal Sat by a period calculated by the CPU 14 and preliminarily set. Specifically, the period is set preliminarily such that recording of the recording data Sr can be started accurately from the recording position in consideration of the process delay time each in the first recording timing generator 48, the switch SW1, the DVD encoder 15 and the strategy circuit 16 and the oscillation delay time of the laser diode in the, pickup 10 and the like.

At the time, the first starting signal Sstt1 is outputted naturally when the detection sync signal Sps is generated normally, but even in the case the prepits 4 are not detected and the detection sync signal Sps is not generated, it is generated by predicting the timing for starting recording of the recording data Sr owing to the function of the sync gate signal Ssg2 described later such that the timing can be set.

Thereafter, the generated first starting signal Sstt1 is outputted to the DVD encoder 15 as the recording starting signal Sstt by the switch SW1 if it is the timing for the addition recording process so that the DVD encoder 15 recognizes the timing for recording the recording data Sr to be the top of one ECC block by the recording starting signal Sstt, and accordingly, the actual addition recording is executed.

4. Sync Detector

Figure 6:
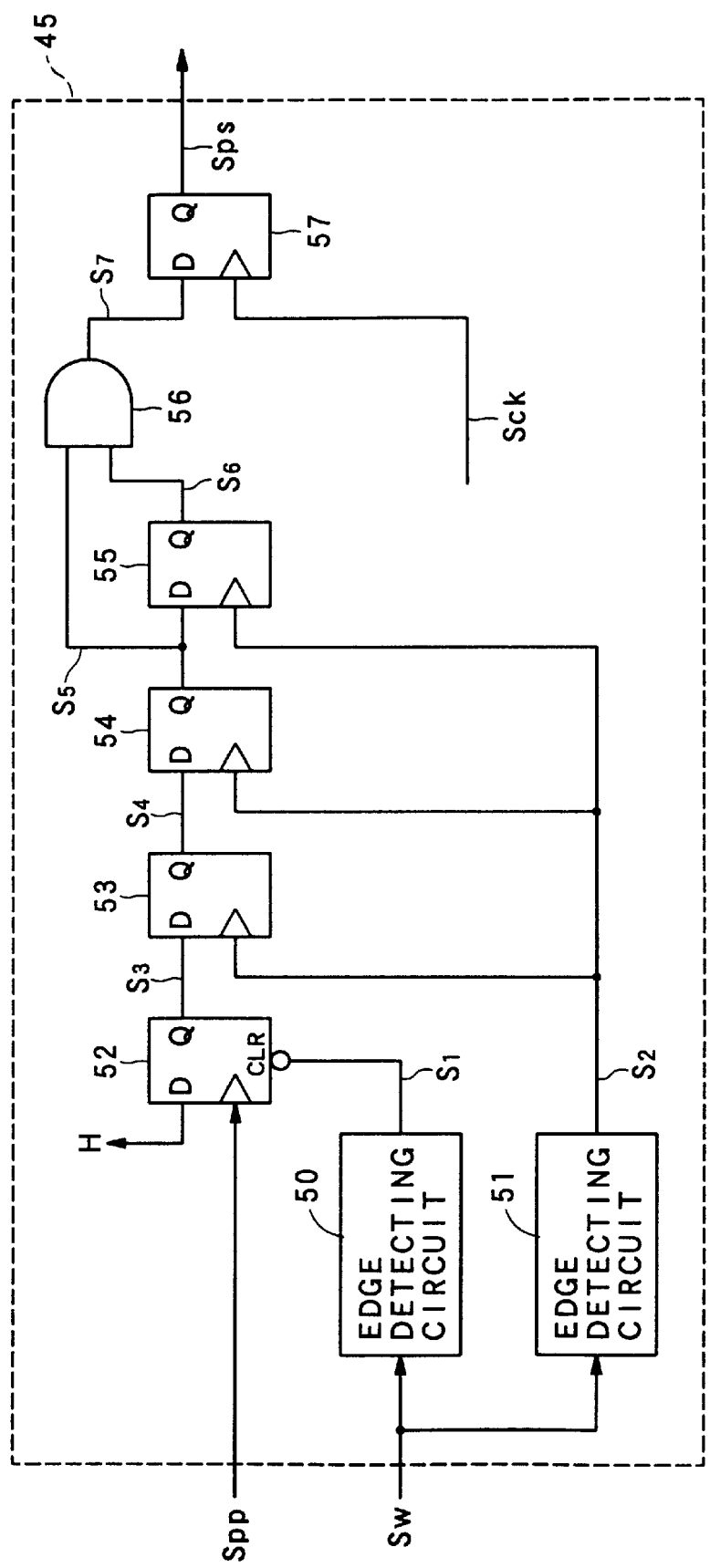
FIG. 6 is a block diagram showing the configuration of a sync detector.
Figure 7:
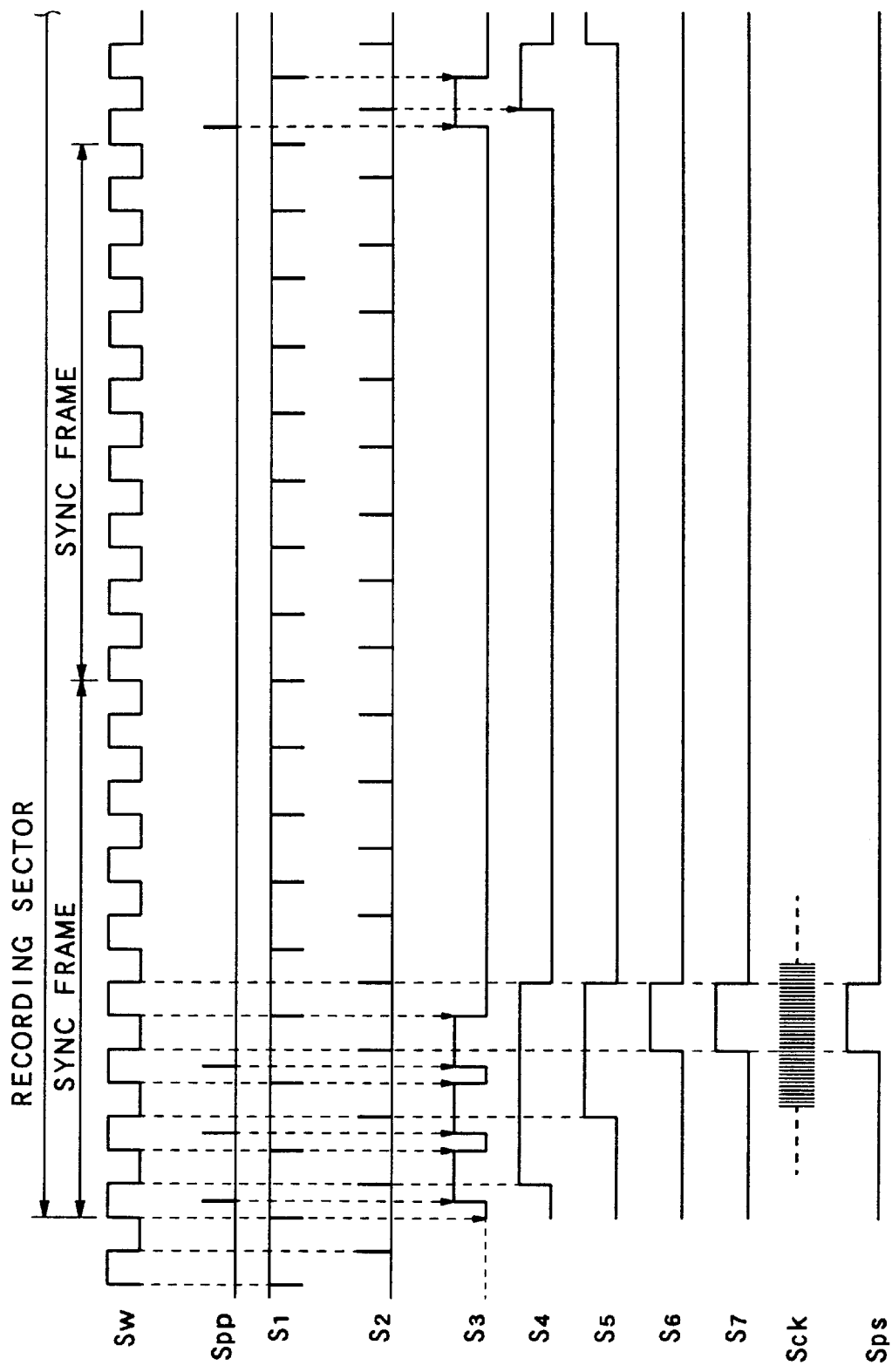
FIG. 7 is a timing chart showing the operation of the sync detector.

Next, the configuration and the operation of the sync detector 45 will be explained with reference to FIGS. 6 and 7. FIG. 6 is a block diagram showing the configuration of the sync detector 45, and FIG. 7 is a timing chart showing the operation of the sync detector 45.

As shown in FIG. 6, the sync detector 45 comprises a rising edge generating circuit 50, a falling edge generating circuit 51, D type flip flop circuits 52, 53, 54, 55 and 57, and an AND circuit 56.

Next, the operation thereof will be explained with reference to FIG. 7. The sync detector 45 detects the prepit 4 indicating the top of the recording sector utilizing three prepits 4 corresponding to the top sync frame of one recording sector formed consecutively at the position of the maximum amplitude in the wobbles in the groove track 2 so as to generate the detection sync signal Sps.

The rising edge generating circuit 50 receives the wobble signal Sw and detects the rising timing thereof. Then, the rising edge generating circuit 50 outputs a signal indicating the rising timing to the clear terminal of the flip flop circuit 52 as the rising signal S1. Moreover, at the same time, the falling edge generating circuit 51 receives the wobble signal Sw, and detects the failing timing thereof. Then, the falling edge generating circuit 51 outputs a signal indicating the falling timing to the clock terminal of the flip flop circuit 53 or 55 as the falling signal S2.

On the other hand, the output of the flip flop circuit 52 becomes "HIGH" at the timing of inputting the prepit signal Spp, and the "HIGH" State is maintained until the next rising signal S1 is inputted. As a result, a timing signal S3 having three consecutive pulses as shown in FIG. 7 is generated at the top timing of one recording sector.

The flip flop circuit 53 generates a timing signal S4 using the timing signal S3 and the falling signal S2. The timing signal S4 is a signal of maintaining the "HIGH" state from the first timing at which the falling signal S2 inputted in the clock terminal becomes from "LOW" to "HIGH" as well as the timing signal S3 is "HIGH" to the timing at which only the falling signal S2 becomes from "LOW" to "HIGH".

The flip flop circuit 54 generates a timing signal S5 using the timing signal S4 and the falling signal S2. The timing signal S5 is a signal of maintaining the "HIGH" state from the first timing at which the falling signal S2 inputted in the clock terminal becomes from "LOW" to "HIGH" as well as the timing signal S4 is "HIGH" to the timing at which only the falling signal S2 becomes from "LOW" to "HIGH" (that is, the timing at which the timing signal S4 changes from "HIGH" to "LOW"). The timing signal S5 is outputted to the flip flop circuit 55 as well as to one of the terminals of the AND circuit 56.

The flip flop circuit 55 generates a timing signal S6 using the timing signal S5 and the falling signal S2. The timing signal S6 is a signal of maintaining the "HIGH" state from the first timing at which the falling signal S2 inputted in the clock terminal becomes from "LOW" to "HIGH" as well as the timing signal S5 is "HIGH" to the timing at which only the falling signal S2 becomes from "LOW" to "HIGH" (that is, the timing at which the timing signals S5 and S4 change from "HIGH" to "LOW"). The timing signal S6 is outputted to the other terminal of the AND circuit 56.

In the AND circuit 56, the AND of the timing signals S5 and S6 is calculated so as to generate a timing signal S7.

Since the timing signal S7 is not generated in the sync detector 45 with the configuration shown in FIG. 6 unless the three consecutive prepits 4 are detected, as a result, in the case the timing signal S7 is in the "HIGH" state, the three prepits 4 detected immediately before indicate the top of one recording sector.

Then, the timing signal S7 and the clock signal Sck are matched in the flip flop circuit 57 so as to generate the detection sync signal Sps.

5. Sync Gate Generator

Figure 8:
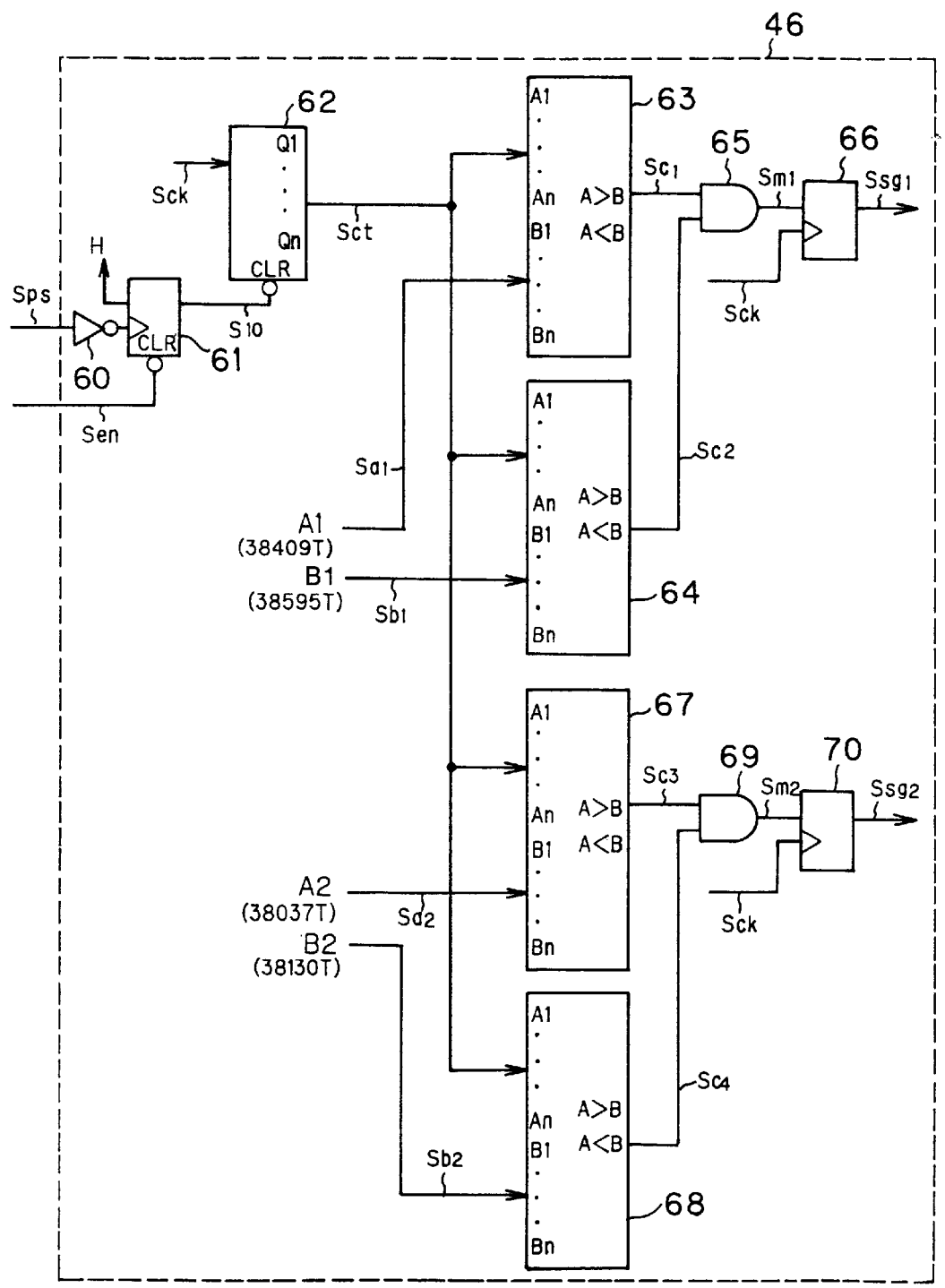
FIG. 8 is a block diagram showing the configuration of a sync gate generator.
Figure 9:
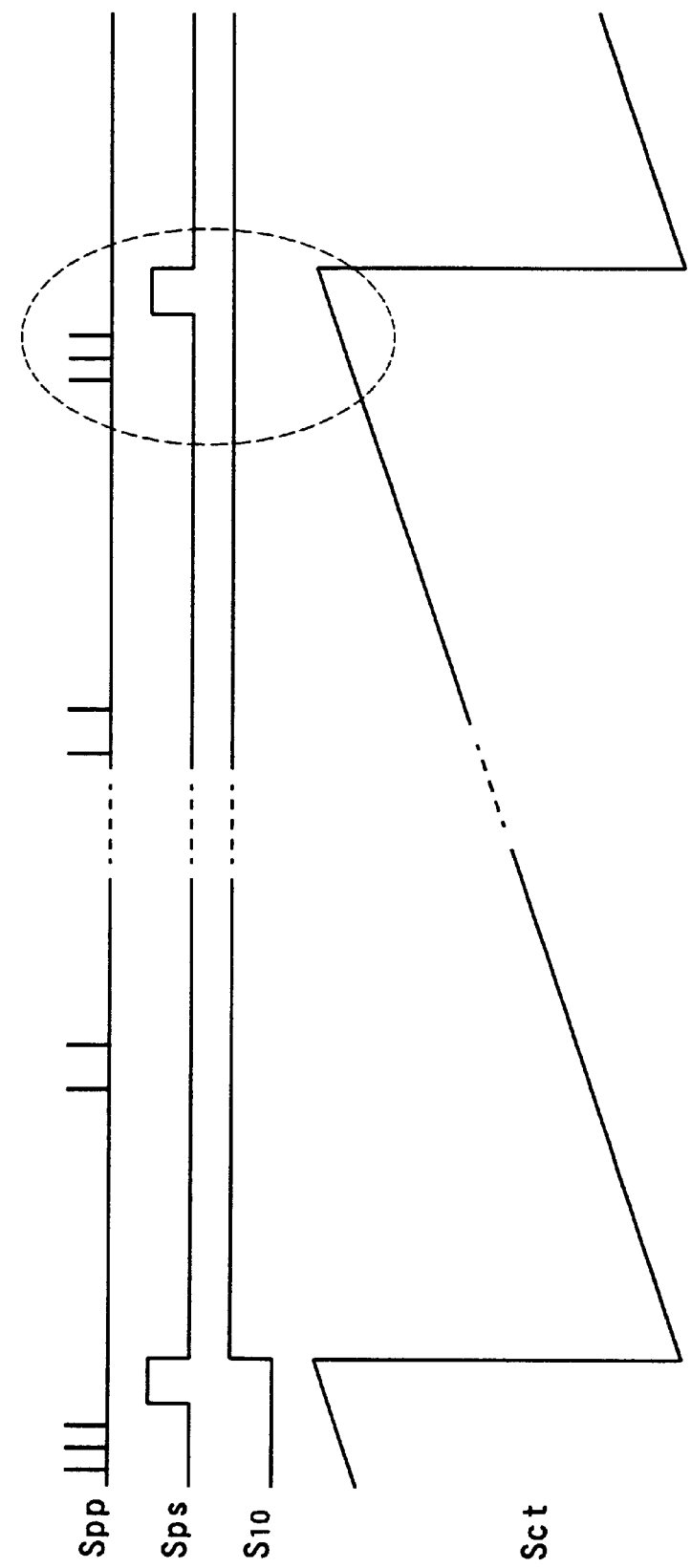
FIG. 9 is a first timing chart showing the operation of the sync gate generator.
Figure 10:
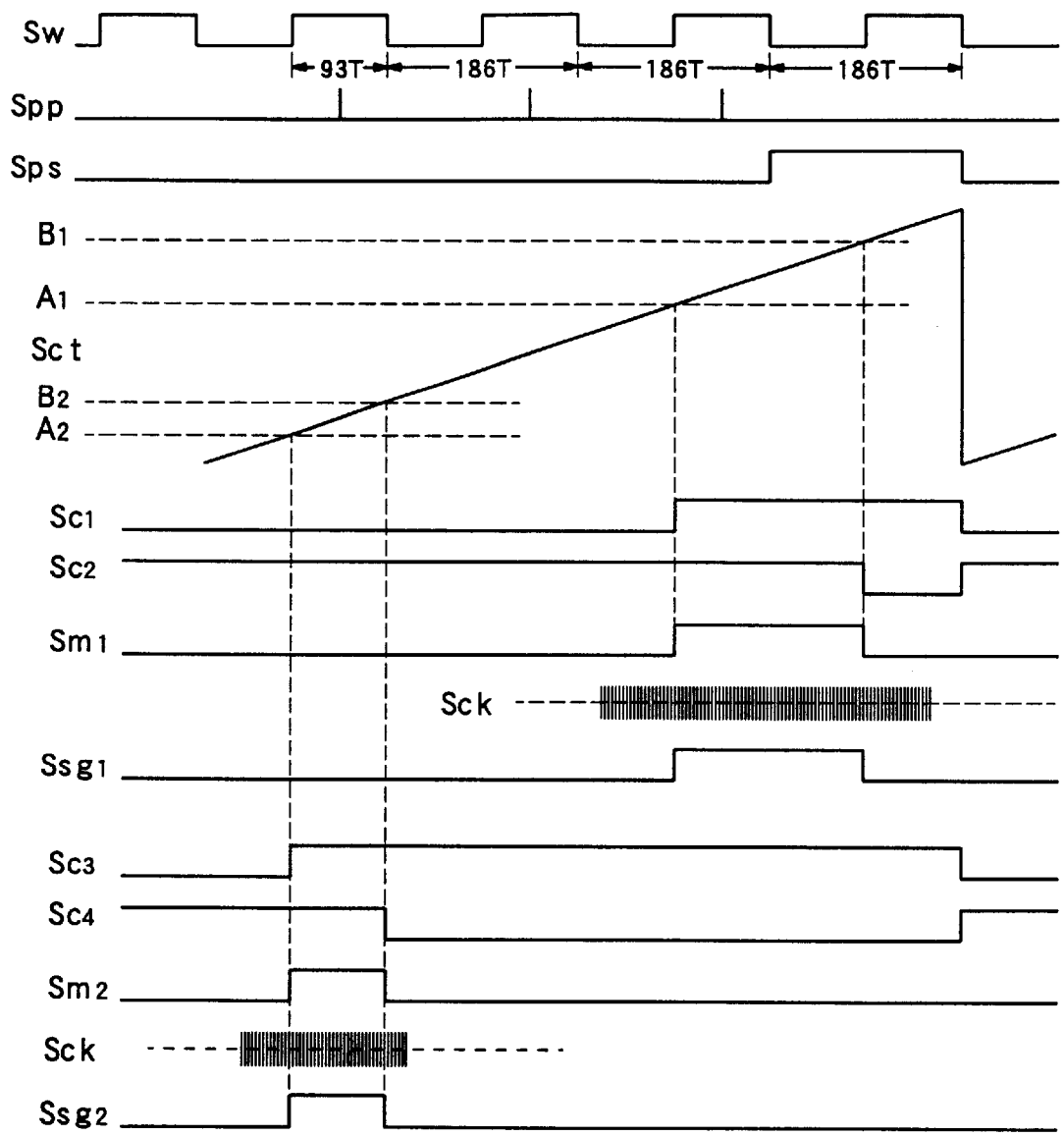
FIG. 10 is a second timing chart showing the operation of the sync gate generator.

Next, the configuration and the operation of the sync gate generator 46 will be explained with reference to FIGS. 8 to 10. FIG. 8 is a block diagram showing the configuration of the sync gate generator 46, and FIGS. 9 and 10 are timing charts showing the operation of the sync gate generator 46.

As shown in FIG. 8, the sync gate generator 46 comprises an inverter 60, D type flip flop circuits 61, 66 and 70, an n-ary counter 62, comparators 63, 64, 67 and 68, and AND circuits 65 and 69.

The n-ary counter 62 is a flywheel counter of restarting the count from "0" when the counted value becomes the below-mentioned formula (1) once the counting operation is started.

$$n=1,488T \times 26 = 38,688T \quad (1)$$

38,988T is the length of one recording sector.

Among the above-mentioned configuration, the inverter 60, the flip flop circuits 61 and 66, the n-ary counter 62, the comparators 63 and 64 and the AND circuit 65 are circuits for generating the sync gate signal Ssg1. On the other hand, the inverter 60, the flip flop circuits 61 and 70, the n-ary counter 62, the comparators 67 and 68 and the AND circuit 69 are circuits for generating the sync gate signal Ssg2.

Next, the operation thereof will be explained with reference to FIGS. 9 and 10. The timing charts shown in FIG. 10 shows the portion of the timing chart of FIG. 9 surrounded by the broken like with the waveform of each signal of the timings enlarged.

The operation of the circuit for generating the sync gate signal Ssg1 will be explained.

The detection sync signal Sps inverted by the inverter 60 is inputted to the clock terminal of the flip flop circuit 61. On the other hand, an enable signal Sen is inputted to the clear terminal of the flip flop circuit 61. The enable signal Sen is a signal indicating matching of various kinds of servo control circuits, generated based on the jump signal Sjp meaning permission of generation of the sync gate signals Ssg1 and Ssg2 by the sync gate generator 46. A timing signal S10 outputted from the flip flop circuit 61 changes from "LOW" TO "HIGH" at the timing when the detection sync signal Sps changes from "HIGH" to "LOW" for the first time after the enable signal Sen is inputted (third row from above in FIG. 9).

The clock signal Sck is inputted in the n-ary counter 62. Further, the counting operation is started when the timing signal S10 becomes "HIGH" in the n-ary counter 62. In the case the counting operation is started, the n-ary counter 62 counts the number of pulses of the clock signal Sck until the counting value becomes n (=38,688T), then, returns the counting value to "0", and counts the number of pulses of the clock signal Sck again until the counting value becomes n. The counting operation is repeated continuously until the timing signal S10 becomes "LOW", regardless of existence of the detection sync signal Sps. As a result, a counting signal Sct to be changed with a saw-tooth shape regardless of existence of the detection sync signal Sps is generated as shown in FIG. 9. The inclination with the right side up of the counting signal Sct denotes increase of the counting value. The counting signal Sct is outputted to the comparators 63 and 64.

As shown in FIG. 10, the comparator 63 compares the counting value of the counting signal Sct and the setting value signal Sa1 corresponding to the setting value A1 preliminarily set. Then, the comparator 63 generates a comparing signal Sc1 to be "HIGH" from the timing at which the counting value becomes larger than the setting value A1 until the counting value is returned to "0" next time, and outputs the same to one of the inputting terminals of the AND circuit 65.

The setting value A1 is a value for setting the rising timing of the sync gate signal Ssg1. The setting value A1 is set, for example, at 38,409T. The value is a value obtained by subtracting the value 1.5 times as much as the wobble cycle from the period corresponding to one recording sector cycle, which is obtained from the below-mentioned formula (2).

$$1,488T \text{ (one sync frame)} \times 26 - 186T \times 1.5 = 38,409T \quad (2)$$

On the other hand, the comparator 64 compares the counting value of the counting signal Sct and a setting value signal Sb1 corresponding to the setting value B1 preliminarily set. Then, the comparator 64 generates a comparing signal Sc2 to be "LOW" from the timing at which the counting value becomes larger than the setting value B1 until the counting value is returned to "0" next time, and outputs the same to the other inputting terminal of the AND circuit 65.

The setting value B1 is a value for setting the falling timing of the sync gate signal Ssg1. The setting value B1 is set, for example, at 38,595T. The value is a value obtained by subtracting the value 0.5 times as much as the wobble cycle from the period corresponding to one recording sector cycle, which is obtained from the below-mentioned formula (3).

$$1,488T \text{ (one sync frame)} \times 26 - 186T \times 0.5 = 38,595T \quad (3)$$

Then, the AND circuit 65 calculates the AND of the comparing signals Sc1 and Sc2 so as to generate a multiplying signal Sm1 and outputs the same to the flip flop circuit 66. The flip flop circuit 66 adjusts the multiplying signal Sm1 based on the clock signal Sck. Accordingly, the sync gate signal Ssg1 is generated.

The sync gate signal Ssg1 rises at the timing at which the counting value of the n-ary counter 62 becomes 38,409T, and falls at the timing at which it becomes 38,595T. Since the n-ary counter 62 repeats the counting operation per the length of one recording sector (38,688T), the positions (timings) of rise and fall of the sync gate signal Ssg1 are constant with respect to the relationship with the recording sectors.

The sync gate signal Ssg1 is used for detection of the locked state by the lock detector 47. As mentioned above, the lock detector 47 judges whether or not it is in the locked state by detecting coincidence of the rising timing of the detection sync signal Sps with the substantially middle timing of the period in which the sync gate signal Ssg1 is "HIGH" for predetermined times. Rise and fall of the sync gate signal Ssg1 are set such that the timing between the detection sync signal Sps and the sync gate signal Ssg1 have the above-mentioned relationship when the prepits 4 are detected normally. That is, in order to realize the setting, the values of the setting values A1 and B1 are set at, for example, 38,409T and 38,595T, respectively.

After generating the sync gate signal Ssg1 once, the sync gate signal Ssg1 can be outputted repeatedly by using a free run counter.

Next, the operation of the circuit for generating the above-mentioned sync gate signal Ssg2 will be explained.

The counting signal Sct outputted from the n-ary counter 62 is outputted not only to the comparators 63 and 64, but also to the comparators 67 and 68.

The comparator 67 compares the counting value of the counting signal Sct and the setting value signal Sa2 corresponding to the setting value A2 preliminarily set. Then, the comparator 67 generates a comparing signal Sc3 to be "HIGH" from the timing at which the counting value becomes larger than the setting value A2 until the counting value becomes to "0" next time, and outputs the same to one of the inputting terminals of the AND circuit 69.

The setting value A2 is a value for setting the rising timing of the sync gate signal Ssg2. The setting value A2 is set, for example, at 38,037T. The value is a value obtained by subtracting the value 3.5 times as much as the wobble cycle from the period corresponding to one recording sector cycle, which is obtained from the below-mentioned formula (4).

$$1,488T \text{ (one sync frame)} \times 26 - 186T \times 3 - 93T = 38,037 \quad (4)$$

The comparator 68 compares the counting value of the counting signal Sct and a setting value signal Sb2 corresponding to the setting value B2 preliminarily set, and generates a comparing signal Sc4 to be "LOW" from the timing at which the counting value becomes larger than the setting value B2 until the counting value is returned to "0" next time, and outputs the same to the other inputting terminal of the AND circuit 69.

The setting value B2 is a value for setting the falling timing of the sync gate signal Ssg2. The setting value B2 is set, for example, at 38,130T. The value is a value obtained by subtracting the value 3 times as much as the wobble cycle from the period corresponding to one recording sector cycle, which is obtained from the below-mentioned formula (5).

$$1,488T \text{ (one sync frame)} \times 26 - 186T \times = 38,130T \quad (5)$$

Then, the AND circuit 69 calculates the AND of the comparing signals Sc3 and Sc4 so as to generate a multiplying signal Sm2 and outputs the same to the flip flop circuit 70. The flip flop circuit 70 adjusts the multiplying signal Sm2 based on the clock signal Sck. Accordingly, the sync gate signal Ssg2 is generated.

The sync gate signal Ssg2 rises at the timing at which the counting value of the n-ary counter 62 becomes 38,037T, and falls at the timing at which it becomes 38,130T. Since the n-ary counter 62 repeats the counting operation per the length of one recording sector (38,688T), the positions (timings) of rise and fall of the sync gate signal Ssg2 are constant with respect to the relationship with the recording sectors.

Rise and fall of the sync gate signal Ssg2 are set such that the timing at which the top prepit 4 is detected coincides with the substantially middle timing of the period in which the sync gate signal Ssg2 is "HIGH" when the three prepits 4 provided at the top of the recording sector are detected normally. In order to realize the setting, the values of the setting values A2 and B2 are set at, for example, 38,037T and 38,130T, respectively.

After generating the sync gate signal Ssg2 once, the sync gate signal Ssg2 can be outputted repeatedly by using a free run counter.

6. Lock Detector

Figure 11:
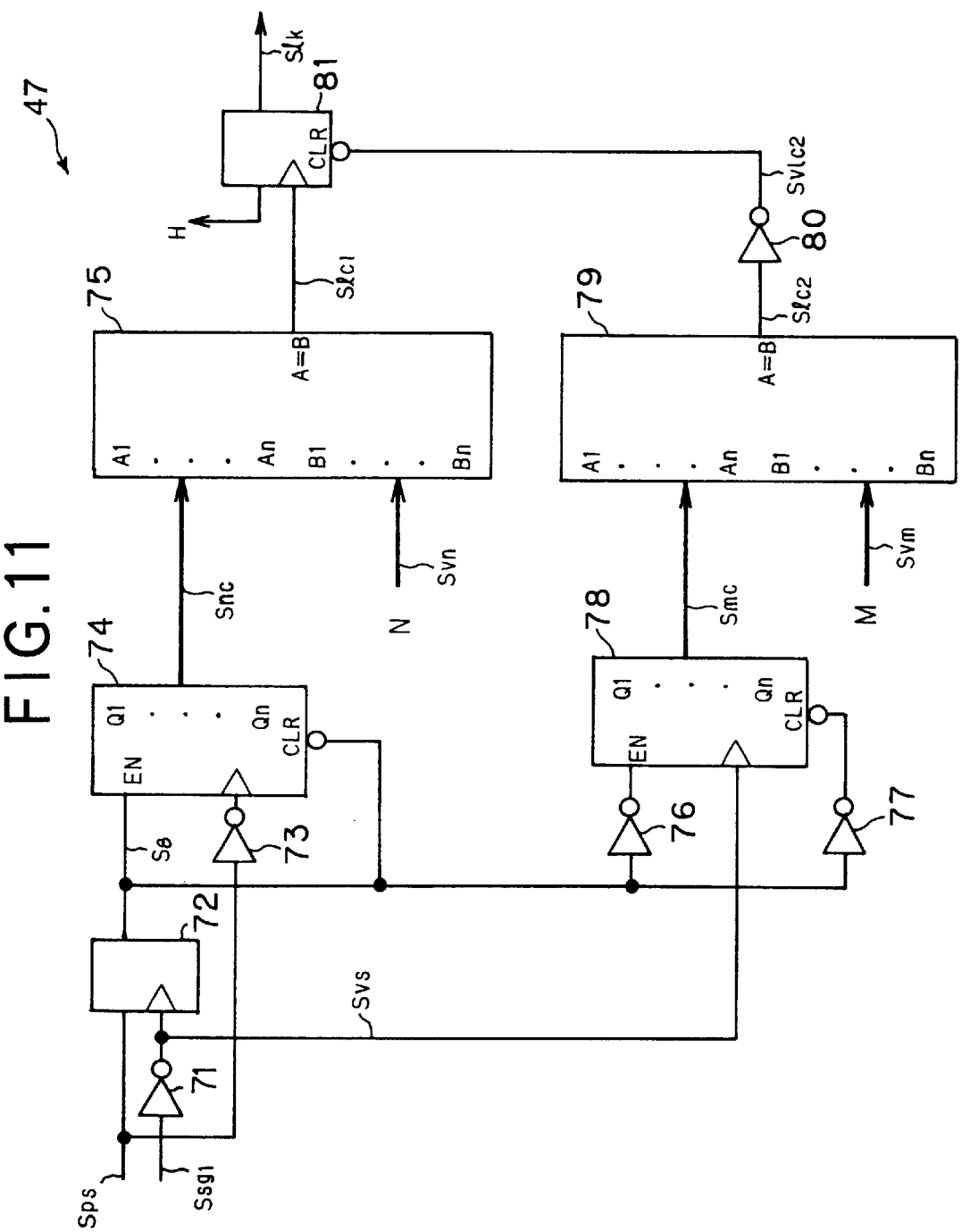
FIG. 11 is a block diagram showing the configuration of a lock detector.
Figure 12A:
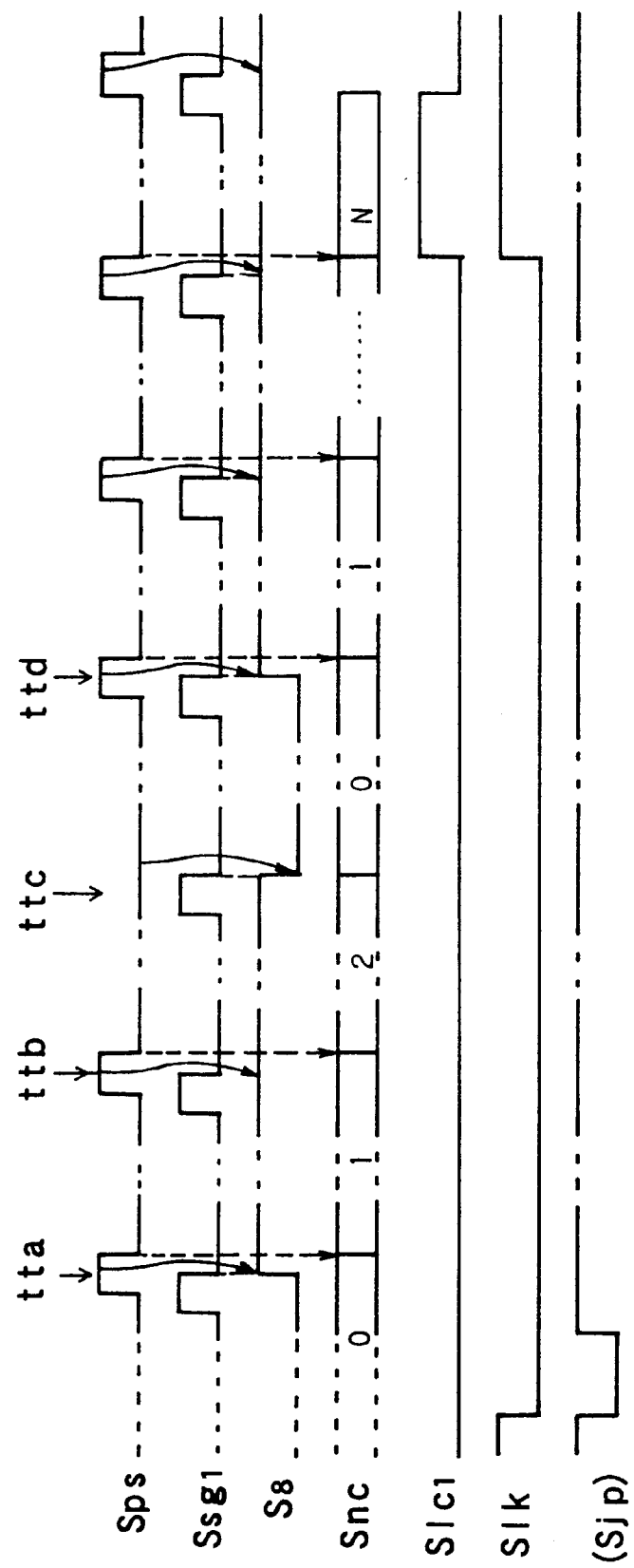
FIGS. 12A and 12B are timing charts showing the operation of the lock detector.
Figure 12B:
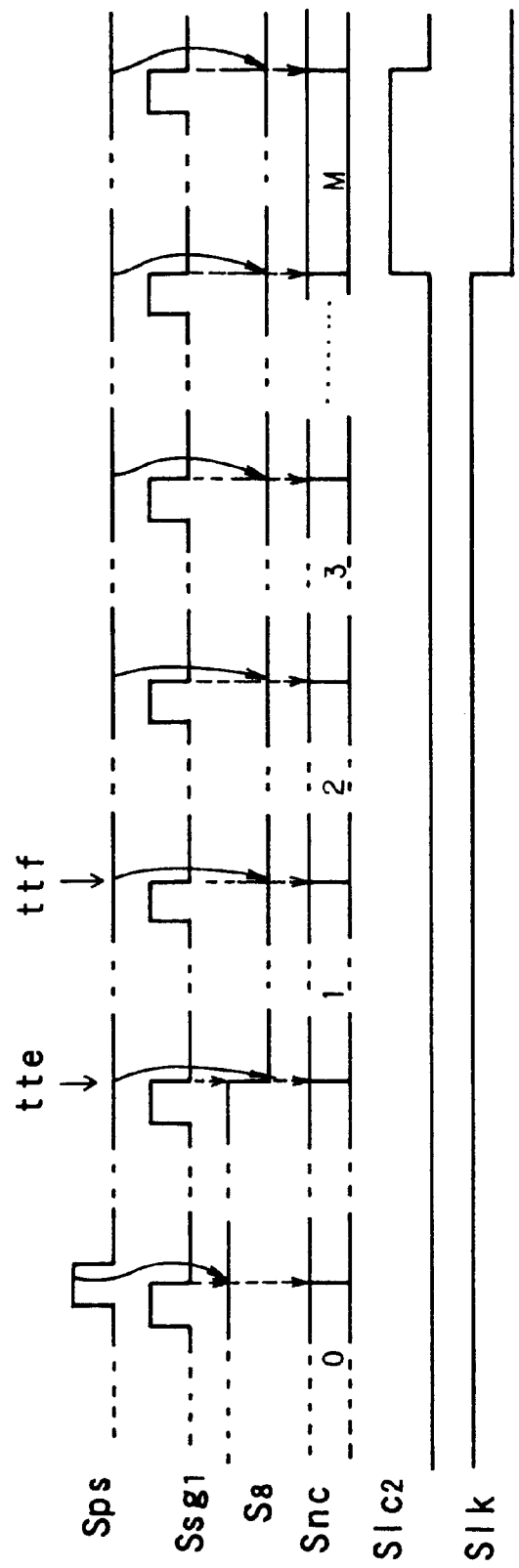

Next, the configuration and the operation of the lock detector 47 will be explained with reference to FIGS. 11, 12A and 12B. FIG. 11 is a block diagram showing the configuration of the lock detector 47, and FIGS. 12A and 12B are timing charts showing the operation of the lock detector 47.

As shown in FIG. 11, the lock detector 47 comprises inverters 71, 73, 76, 77 and 80, D type flip flop circuits 72 and 81, n-ary counters 74 and 78, and comparators 75 and 79.

Among these elements, the inverters 71 and 73, the flip flop circuit 72, the n-ary counter 74 and the comparator 75 are circuits for detecting that the locked state is obtained from the unlocked state (that is, circuits for setting the rising timing of the lock signal Slk). On the other hand, the inverters 71, 76, 77 and 80, the flip flop circuit 72, the n-ary counter 78 and the comparator 79 are circuits for detecting that the unlocked state is obtained from the locked state derived from the flaw or the like, on the DVD-R/W1 (that is, a circuit for setting the falling timing of the lock signal Slk).

Next, the operation of the lock detector 47 will be explained with reference to FIGS. 12A and 12B.

First, the operation of the above-mentioned circuit for detecting the locked state will be explained with reference to FIG. 12A.

The detection sync signal Sps is inputted in the input terminal of the flip flop circuit 72. A signal obtained by inverting the sync gate signal Ssg1 by the inverter 71 is inputted in the clock terminal of the flip flop circuit 72.

In general, the D type flip flop circuit sets the logic of the output signal such that the logic of the output signal ("HIGH" or "LOW") coincides with the logic of the input signal at the timing at which the signal inputted in the clock terminal becomes "HIGH" as well as maintains the set logic until the signal inputted in the clock terminal becomes "HIGH" next time.

Therefore, when the prepits 4 corresponding to the top of the recording sector are detected normally and the detection sync signal Sps is generated normally (marks tta and ttb in FIG. 12A), the flip flop circuit 72 sets the logic of the output signal S8 such that the logic of the output signal S8 coincides with the logic of the detection sync signal Sps inputted then at the timing at which the sync gate signal Ssg1 becomes "LOW" as well as maintains the logic until the sync gate signal Ssg1 is switched from "HIGH" to "LOW" next time as shown in FIG. 12A. As a result, when the detection sync signal Sps and the sync gate signal Ssg1 are generated normally, the logic of the output signal S8 is always "HIGH".

On the other hand, for example, when the prepits 4 are not detected normally due to the flaw on the DVD-R/W1 or the like, and thus the detection sync signal Sps is not generated normally (mark ttc in FIG. 12A), since the detection sync signal Sps is "LOW" when the sync gate signal Ssg1 falls, the logic of the output signal S8 changes to "LOW" from the falling timing, and the "LOW" state is maintained until the detection sync signal Sps is detected normally next time.

When the detection sync signal Sps is detected normally next time (mark ttd in FIG. 12A), the logic of the output signal S8 changes to "HIGH" from the falling timing of the corresponding sync gate signal Ssg1, and the state is maintained hereafter.

Then, the output signal S8 is supplied to the enable terminal and the clear terminal of the n-ary counter 74. Furthermore, the signal provided by inverting the detection sync signal Sps by the inverter 73 is inputted in the clock terminal of the n-ary counter 74.

The n-ary counters 74 and 78 shown in FIG. 11 start counting of pulses inputted in the clock terminal and outputs the counting signal Snc or Smc when the logic of the signal inputted in the enable terminal changes from "LOW" to "HIGH", and initialize the counting value of the counting signal Snc or Smc at the timing at which the signal inputted in the clear terminal changes from "HIGH" to "LOW". The n-ary counter 74 and 78 repeat the operation.

Therefore, as shown in the fourth row from above in FIG. 12A, when the detection sync signal Sps is not detected normally and the output signal S8 of the flip flop circuit 72 is "LOW", the counting value of the counting signal Snc is "0", and when the detection sync signal Sps is generated and the output signal S8 is changed to "HIGH" (mark tta in FIG. 12A), the counting value of the counting signal Snc is increased by "1" at the timing at which the detection sync signal Sps at "HIGH" falls at the timing of the change. Thereafter, the counting value is increased.

When the output signal S8 is changed to "LOW" without generation of the detection sync signal Sps next time (mark ttc in FIG. 12A), the counting signal Snc is initialized at the timing at which it is changed to "LOW".

The above-mentioned counting operation is repeated hereafter, and the counting value of the counting signal Snc starts to increased when the detection sync signal Sps is generated next time. Then, the counting signal Snc is supplied to the comparator 75.

The comparator 75 compares the counting value of the counting signal Snc and a setting value signal Svn corresponding to a setting value N preliminarily set. Then, the comparator 75 generates a comparing signal Slc1 to be "HIGH" only in the period in which the counting value is equal to the setting value N (one cycle in the detection sync signal Sps), and outputs the same to the clock terminal of the flip flop circuit 81.

As shown in FIG. 12A, the above-mentioned setting value N is a value showing the number of the detection sync signals Sps to be generated from when the detection sync signal Sps starts to be generated normally until it is in the above-mentioned locked state certainly, and is, for example, a number of 2 or more.

Then, the flip flop circuit 81 changes the logic of the lock signal Slk which has been "LOW" until then to "HIGH" at the timing at which the comparing signal Slc1 is inputted, and thereafter maintains the "HIGH" logic of the lock signal Slk until an inversion comparing signal Svlc2 later described is inputted to the clear terminal of the flip flop circuit 81.

As shown in FIG. 12A, it is needless to say that the jump signal Sjp is "HIGH" when the lock signal Slk becomes "HIGH".

Next, the operation of the circuit for detecting the unlocked state will be explained with reference to FIG. 12B.

Since the operation of the inverter 71 and the flip flop circuit 72 is the same as that of the above-mentioned circuit for detecting the locked state, detailed explanation is not given here.

The signal provided by inverting the logic of the output signal S8 by the inverters 76 and 77 is inputted in the enable terminal and the clear terminal of the n-ary counter 78, respectively. Furthermore, the signal obtained by inverting the sync gate signal Ssg1 by the inverter 71 is inputted in the clock terminal of the n-ary counter 78.

Therefore, as shown in the fourth row from above in FIG. 12B, when the detection sync signal Sps is detected normally and the output signal S8 is "HIGH", the counting operation is not started in the n-ary counter 78 and the counting value of a counting signal Smc is "0".

When the detection sync signal Sps is not generated and the output signal S8 is changed from "HIGH" to "LOW" (mark tte in FIG. 12B), and the counting operation of pulses of the signal provided by inverting the sync gate signal Ssg1 is started in the n-ary counter 78 from the timing, and thereafter the operation of increasing the counting value of the counting signal Smc by "1" is repeated at the timing at which the detection sync signal Ssg1 changes from "HIGH" to "LOW" (mark ttf and after in FIG. 12B).

When the detection sync signal Sps is generated so that the output signal S8 is changed to "HIGH" next time (third row from above in FIG. 12A), the counting signal Smc is initialized at the timing at which it is changed to "HIGH".

The above-mentioned counting operation is repeated hereafter, and the counting value of the counting signal Smc starts to increased when the detection sync signal Sps is not generated next time.

The comparator 79 with the counting signal Smc inputted compares the counting value of the counting signal Smc and the setting value signal Svm corresponding to a setting value M preliminarily set, generates a comparing signal Slc2 to be "HIGH" only in the period in which the counting value is equal to the setting value M (one cycle in the detection sync signal Sps), and outputs the same to the clear terminal of the flip flop circuit 81 after inversion of the logic thereof by the inverter 80 so as to be an inversion comparing signal Svlc2.

As shown in the fourth row from above in FIG. 12B, the above-mentioned setting value M is a value showing the number of the detection sync signals Sps not generated from when the detection sync signal Sps starts not to be generated until it is in the above-mentioned locked state certainly, and as a specific value, thereof, for example, about "5" or "6" is appropriate.

Then, the flip flop circuit 81 changes the logic of the lock signal Slk which has been changed to "HIGH" by the comparing signal Slc1 to "LOW" again at the timing at which the comparing signal Slc2 is changed from "LOW" to "HIGH" (see the lowermost row in FIG. 12B), and thereafter maintains the "LOW" logic until the above-mentioned inversion comparing signal Svlc1 changes from "LOW" to "HIGH".

According to the above-mentioned operation of the lock detector 47, the above-mentioned lock signal Slk, which is changed to "HIGH" when the locked state is established, and is changed to "LOW" when the unlocked state is established, is generated so as to be outputted to the recording timing generator 48.

7. First Recording Timing Generator

Figure 13:
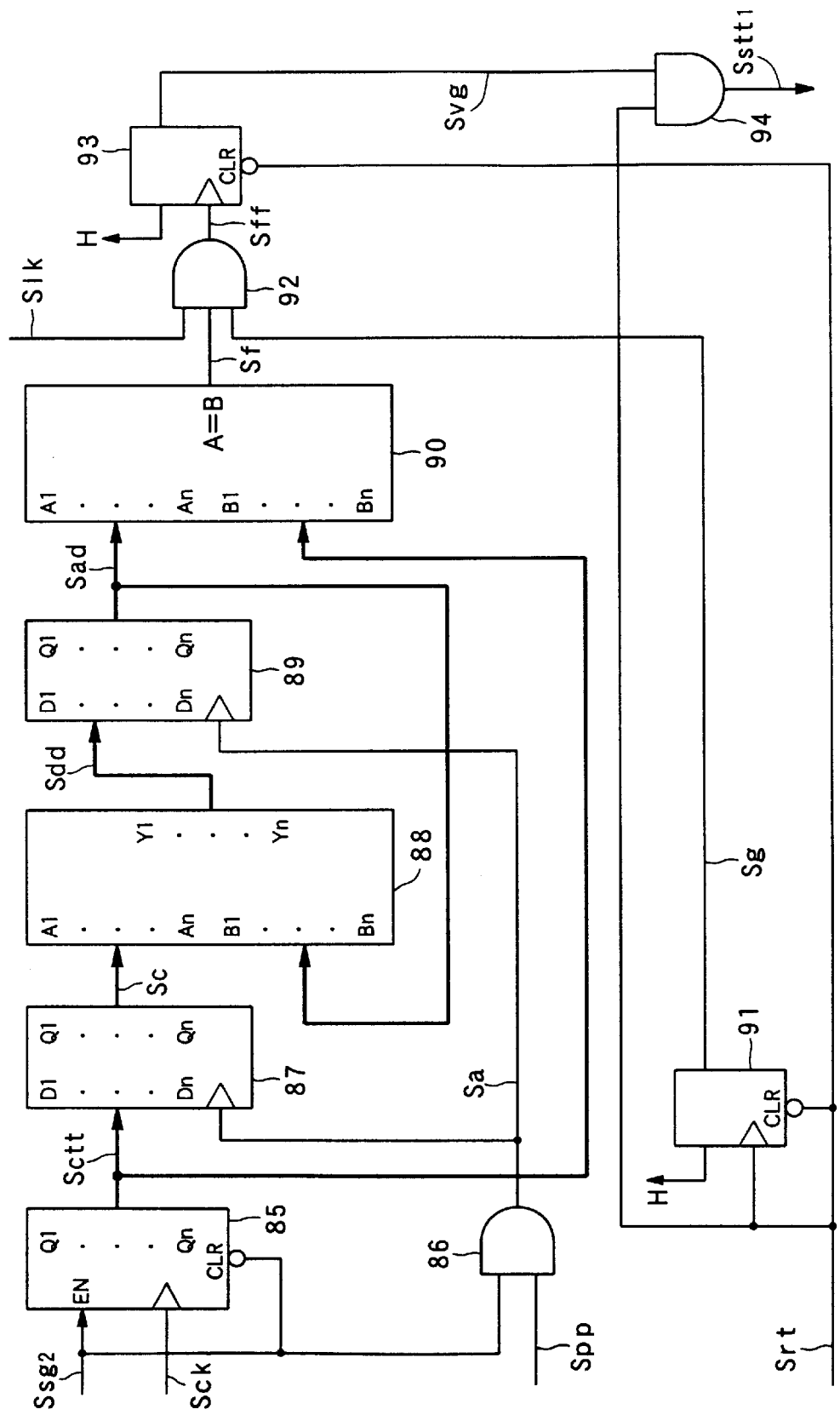
FIG. 13 is a block diagram showing the configuration of a first recording timing generator.
Figure 14:
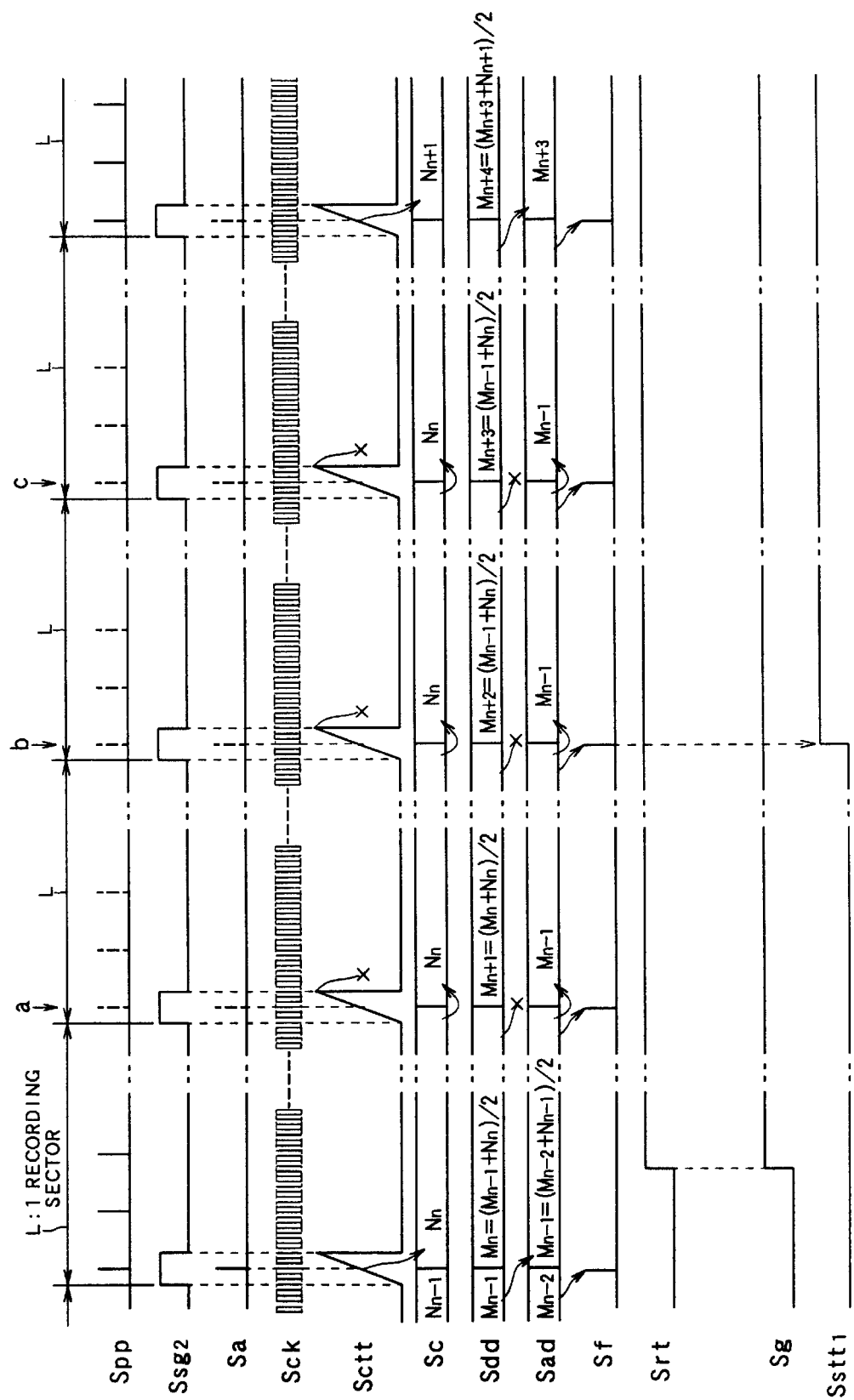
FIG. 14 is a timing chart showing the operation of the first recording timing generator.

Next, the configuration and the operation of the first recording timing generator 48 will be explained with reference to FIGS. 13 and 14. FIG. 13 is a block diagram showing the configuration of the first recording timing generator 48, and FIG. 14 is a timing chart showing the operation of the first recording timing generator 48.

As shown in FIG. 13, the recording timing generator 48 comprises an n-ary counter 85, 2-input AND circuits 86 and 94, D type flip flop circuits 87, 89, 91 and 93, an adder 88, a comparator 90, and 3-input AND circuit 92.

Next, the operation of the first recording timing generator 48 will be explained with reference to FIG. 14. The uppermost row in FIG. 14 shows only the prepits 4 corresponding to the top of each recording sector. The pulses shown by the broken line represents the cases in that the prepits 4 to be detected at the timing are not detected due to the flaw on the DVD-R/W1 or the like.

The prepit signal Spp (see the uppermost row in FIG. 14) and the sync gate signal Ssg2 (see the second row from above in FIG. 14) are inputted in the AND circuit 86. The AND circuit 86 generates a multiplying signal Sa only when both signals are "HIGH", and outputs the same to the clock terminals of the flip flop circuits 87 and 89. Therefore, when the prepits 4 are not-detected normally, the multiplying signal Sa remains "LOW", and thus the output signals Sc and Sad of the flip flop circuits 87 and 89 later described are not renewed at the timing.

The sync gate signal Ssg2 is inputted in the enable terminal and the clear terminal of the n-ary counter 85, and the clock signal Sck (see the fourth row from above in FIG. 14) is inputted in the clock terminal, respectively. The n-ary counter 85 starts counting of pulses in the clock signal Sck from the timing at which the sync gate signal Ssg2 changes from "LOW" to "HIGH", and outputs the counting signal Sctt corresponding to the counting value (see the fifth row from above in FIG. 14). Then, the n-ary counter 85 stops counting at the timing at which the sync gate signal Ssg2 changes from "HIGH" to "LOW" next time, and initializes the counting value of the counting signal Sctt to "0". The n-ary counter 85 repeats the operation whenever a pulse of the sync gate signal Ssg is inputted.

The flip flop circuit 87 maintains the counting value when the multiplying signal Sa inputted in the clock terminal becomes "HIGH" among the counting values of the counting signal Sctt inputted in the input terminal thereof, and continues to output the same as the output signal Sc. Furthermore, the flip flop circuit 87 renews the counting values included in the output signals Sc until then to the counting value of the counting signal Sctt inputted in the input terminal then when the multiplying signal Sa becomes "HIGH" next time. As a result, the counting value shown by the output signal Sc is renewed. The flip flop circuit 87 repeats the operation whenever a pulse of the multiplying signal Sa is inputted.

Therefore, when the multiplying signal Sa remains "LOW" without detection of the prepits 4 as mentioned above, the value until then is maintained without renewal of the counting value shown by the output signal Sc to the value of the counting signal Sctt (period from "a" to "c" in FIG. 14).

The output signal Sc and the output signal Sad of the flip flop circuit 89 are inputted in the adder 88. The adder 88 adds the output signal Sc and the output signal Sad having the same bit number (for example, n bits), and outputs the addition result as an n bit adding signal Sdd. As a result, the adding signal Sdd shows the value corresponding to the average value of the counting value included in the output signal Sc and the counting value included in the output signal Sad (see the seventh row from above in FIG. 14).

The flip flop circuit 89 maintains the value when the multiplying signal Sa inputted in the clock terminal becomes "HIGH" among the values of the adding signal Sdd inputted in the input terminal thereof, and continues to output the same as the output signal Sad to the adder 88 and the comparator 90 (see the sixth row from below in FIG. 14). Furthermore, the flip flop circuit 89 renews the counting values included in the output signals Sad until then to the value of the adding signal Sdd inputted in the input terminal then when the multiplying signal Sa becomes "HIGH". As a result, the counting value shown by the output signal Sad is renewed. The flip flop circuit 89 repeats the operation whenever a pulse of the multiplying signal Sa is inputted.

Therefore, when the multiplying signal Sa remains "LOW" without detection of the prepits 4 as mentioned above, the value until then is maintained without renewal of the counting value shown by the output signal Sad to the value of the adding signal Sad (period from "a" to "c" of the uppermost row in FIG. 14).

The output signal Sad and the counting signal Sctt are inputted independently in the comparator 90. The comparator 90 compares the counting value shown by the output signal Sad and the counting value shown by the counting signal Sctt, generates a comparing signal Sf to be "HIGH" at the timing when both counting value become equal (see the fifth row from below in FIG. 14), and outputs the same to one of the input terminals of the AND circuit 92.

As shown by the mark "a" in FIG. 14, the comparator 90 generates the comparing signal Sf, for example, when the counting value shown by the output signal Sad at the timing when the counting operation of the n-ary counter 85 is started (value shown as Mn−1 in the sixth row from below in FIG. 14) and the counting value shown by the counting signal Sctt coincide.

The comparing signal Sf becomes "HIGH" at the timing corresponding to the counting value maintained in the flip flop circuit 89 even in the case the prepits 4 are not detected normally according to the operation of the flip flop circuits 87 and 89, and the adder 88 explained so far.

Then, if the designation signal Srt showing the recording position prior, by one recording sector with respect to the recording position on the DVD-R/W1 for recording the recording data Sr is inputted at the timing shown by the third row from below in FIG. 14, the flip flop circuit 91 generates an output signal Sg to continue to be "HIGH" after the timing at which the designation signal Srt becomes "HIGH" (see the second row from below in FIG. 14), and outputs the same to the second input terminal of the AND circuit 92. At the time, the output signal Sg shows that the position irradiated with the light beam B by the pickup 10 is the position of the recording sector prior by one from the recording sector in which the position for recording the recording data Sr is included.

On the other hand, the AND circuit 92 outputs a timing signal Sff when all of the output signals Sad and Sg, and the lock signal Slk independently inputted are "HIGH". Therefore, the timing signal Sff becomes "HIGH" when the detection sync signal Sps is generated stably (that is, the prepits 4 are detected normally) so that it is in the locked state, the recording sector prior by one from the recording sector in which the position for recording the recording data Sr is included is irradiated with the light spot SP, and it is at the timing to be the standard for setting the position of recording the recording data Sr.

Then, the flip flop circuit 93 outputs the inputted timing signal Sff as it is to the AND circuit 94 as the timing signal Svg when the designation signal Srt is "HIGH".

The AND circuit 94 generates the first starting signal Sstt1 to be "HIGH" when both timing signal Svg and designation signal Srt are "HIGH" (see the lowermost row in FIG. 14), and outputs the same to the above-mentioned switch SW1.

8. Second Timing Generator

Figure 15:
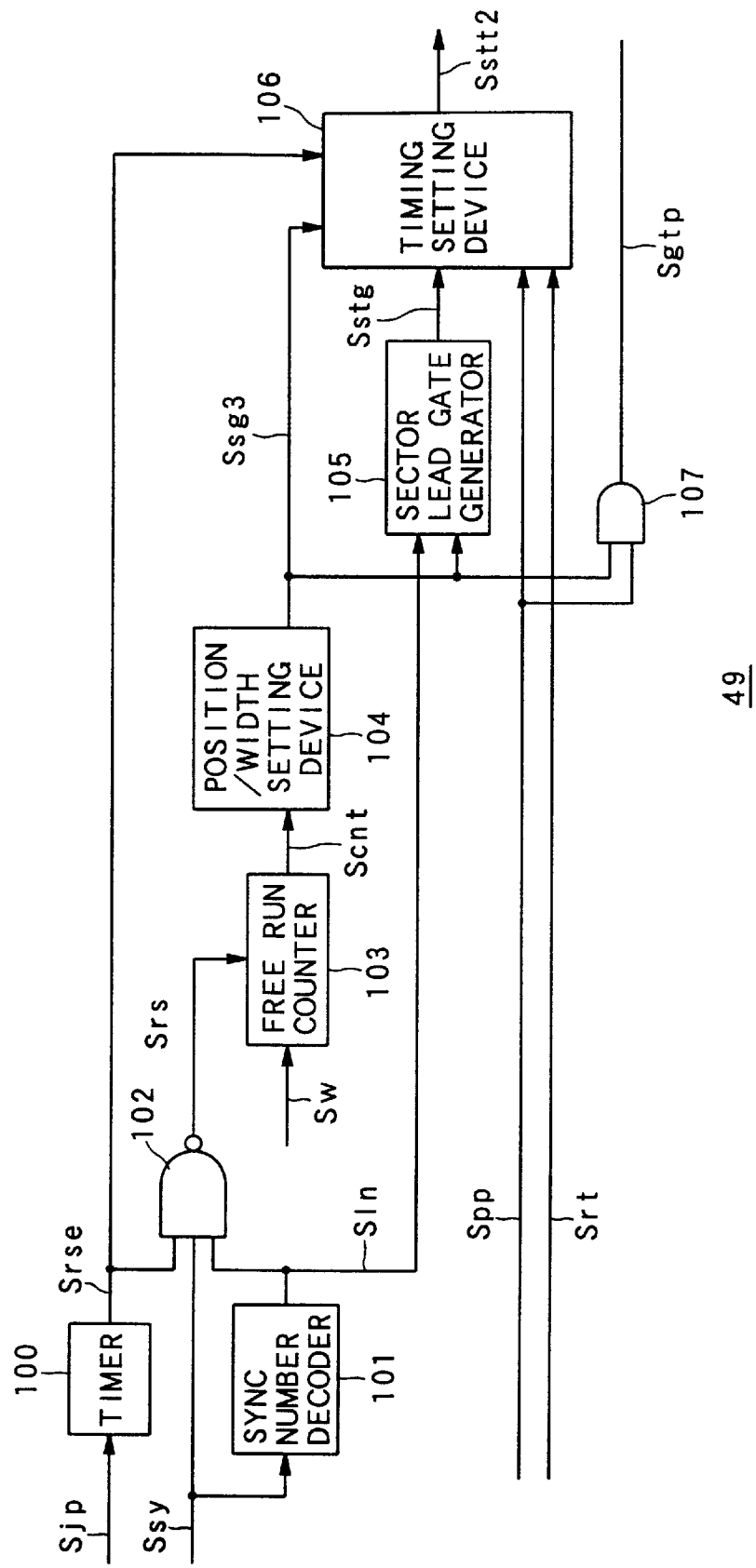
FIG. 15 is a block diagram showing the configuration of a second recording timing generator.
Figure 16:
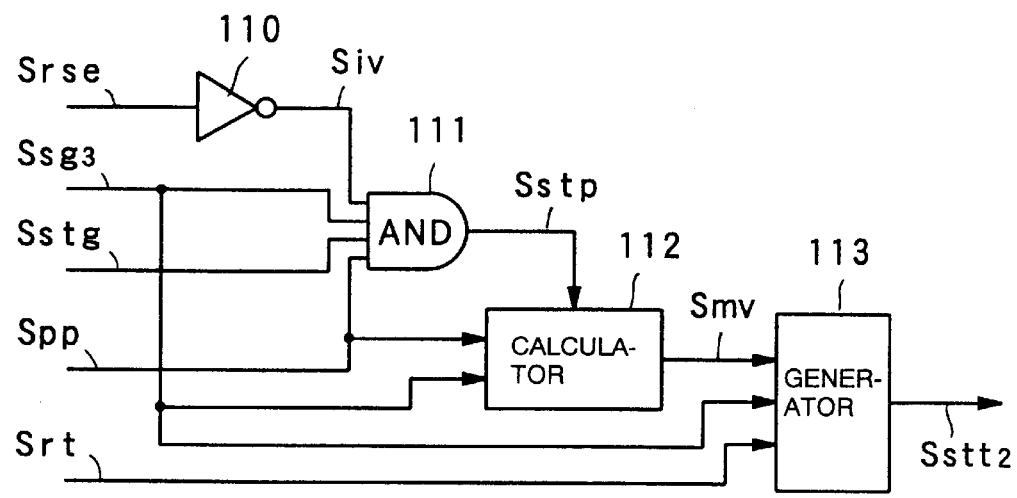
FIG. 16 is a block diagram showing the configuration of a timing setting device.
Figure 17:
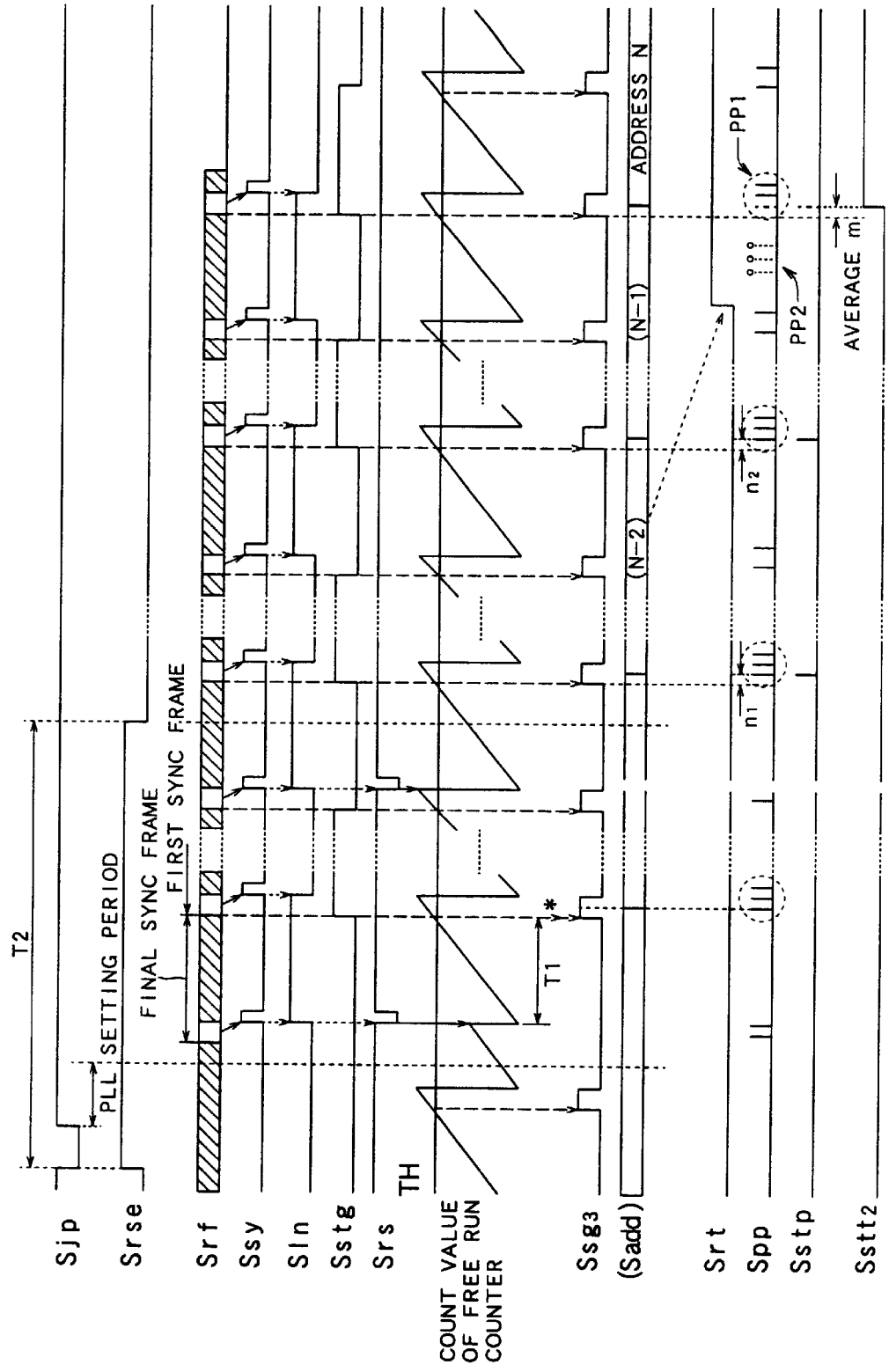
FIG. 17 is a timing chart showing the operation of the second recording timing generator.

The configuration and the operation of the second recording timing generator 49 will be explained with reference to FIGS. 15 to 17. FIG. 15 is a block diagram showing the configuration of the second recording timing generator 49, FIG. 16 is a block diagram showing the configuration of the timing generator 106, and FIG. 17 is a timing chart showing the operation of the entire information recording apparatus S including the second recording timing generator 49 in the overwrite recording process. Moreover, pulses shown by the mark PP1 in the push-pull signal Spp shown in FIG. 17 represent the state of absence of detection although they are at the timing to be detected by the influence of the phase change pit showing the synchronization information SY formed adjacent thereto. On the other hand, pulses shown by the mark PP2 represent the state of detection of pulse signals such as the prepit signal Spp at the timing not to be detected by the influence of the phase change pit.

As shown in FIG. 15, the second recording timing generator 49 comprises a timer 100, a sync number decoder 101, a NAND circuit 102, a free run counter 103, a position/width setting device 104, a sector lead gate generator 105, a timing setting device 106, and an AND circuit 107.

As shown in FIG. 16, the timing setting device 106 comprises an inverter 110, an AND circuit 111, a calculator 112, and a generator 113.

The operation of the information recording apparatus S in the overwrite recording process mainly including the operation of the second recording timing generator 49 will be explained with reference to FIGS. 15 to 17. Among the reproduction RF signal Srf shown in the third row from above in FIG. 17, the portion hatched with slant lines represents the portion of the recording information already recorded in the DVD-R/W1, and the blank portion represents the synchronization information SY (see FIG. 2).

The timer 100 receives the jump signal Sjp. Then, the timer 100 starts clocking from the timing at which the jump signal Sjp changes from "HIGH" to "LOW" (that is at the timing at which it is unlocked). Then, when a preliminarily set synchronization information detecting period T2 is passed, the timer 100 finishes clocking. The timer 100 executes the clocking operation whenever the jump signal Sjp changes from "HIGH" to "LOW". According to the clocking operation, the timer 100 generates a re-sync enable signal Srse. The, re-sync enable signal Srse is a signal to be changed from "LOW" to "HIGH" at the timing when the jump signal Sjp changes from "HIGH" to "LOW", and to be changed from "HIGH" to "LOW" when the clocking operation by the timer 100 is finished. The re-sync enable signal Srse is outputted to the NAND circuit 102 and the timing setting device 106.

Here, the synchronization information detecting period T2 is the time totaling the setting period from the timing at which the jump signal Sjp is changed from "HIGH" to "LOW" until various kinds of servo controls are resumed, and the time until at least one pulse of the sync signal Ssy is detected after the passage of the setting period. More specifically, the synchronization information detecting period T2 is a period with a margin time in consideration of the case in which the synchronization information SY is not detected due to the flaw on the DVD-R/W1 or the like, in the period when the detection RF signal srf is detected for at least one recording sector added to the setting period. The synchronization information detecting period T2 is set preliminarily.

On the other hand, at the same time, the sync number decoder 101 decodes the content of each synchronization information SY in the inputted sync signal Ssy, generates a final sync number signal Sin, and outputs the same to one of the input terminals of the NAND circuit 102 and the sector lead gate generator 105. The final sync number signal Sln is a signal to change to "HIGH" immediately after detection of the synchronization information SY in the final sync frame in one recording sector, and to "LOW" after passage of time corresponding to the length of one sync frame.

Here, the synchronization information SY has the meaning as the timing information showing the top of one sync frame. Furthermore, the synchronization information SY includes the number information indicating the ordinal number of the sync frame in which itself is included in one recording sector. Since the number of sync frames included in one recording sector is 26, the number information is a value from "0" to "25".

Therefore, the final sync number signal Sln maintains the "HIGH" level from the timing at which the sync signal Ssy corresponding to the synchronization information Sy with the "25" number information for the period corresponding to the length of one sync frame. In other words, the timing at which the final sync number signal Sln changes from "HIGH" to "LOW" coincides with the timing immediately after finish of detection of the synchronization information SY in the top sync frame in one recording sector (see the third row and the fifth row from above in FIG. 17).

Then, the NAND circuit 102 generates a re-sync enable signal Srs to change from "HIGH" to "LOW" at the timing when all of the sync signal Ssy, the re-sync enable signal Srse and the final sync number signal Sln become "HIGH" and change from "LOW" to "HIGH" at the timing at which the sync signal Ssy change from "HIGH" to "LOW", and outputs the same to the free run counter 103.

As shown in the third row and the fourth row from above in FIG. 17, since the sync signal Ssy is a pulse signal to change from "LOW" to "HIGH" at the timing when the synchronization information SY of the detected reproduction RF signal Srf is finished, the re-sync signal Srs is a signal showing the timing of finish of detection of the synchronization information Sy in the final sync frame in one recording sector.

Then, the free run counter 103 counts the pulses of the wobble signal Sw. First, the free run counter 103 is reset at the timing when the re-sync signal Srs changes from "HIGH" to "LOW". Then, the free run counter 103 is reset again when the pulse number of the wobble signal Sw becomes the predetermined number corresponding to one sync frame. The free run counter 103 repeats the operation. As shown in FIG. 2, since the length 8 times as much as the wavelength of the wobble is the same as the length of one sync frame in this embodiment, the predetermined number corresponding to one sync frame is set at "8" preliminarily.

Furthermore, the free run counter 103 generates a count signal Scnt showing the timing when the counting value becomes a preliminarily set threshold value TH, and outputs the same to the position/width setting device 104.

At the time, as shown in the eighth row from above in FIG. 17, the threshold value TH is the value equal to the pulse number of the wobble signal Sw to be counted in the period obtained by subtracting the period in which the synchronization information SY is detected from the period corresponding to one sync frame (that is, the period corresponding only to the recording information SY in one sync frame) T1.

According to the process, since the re-sync signal Srs shows the timing of finish of detection of the synchronization information SY in the final sync frame in one recording sector as mentioned above, the timing when the count signal Scnt becomes "HIGH" for the first time after the change of the jump signal Sjp from "LOW" to "HIGH" (marked with * in FIG. 17) represents the timing of starting the top sync frame in one recording sector. The count signal Scnt to be generated thereafter represents the timing of the top of each subsequent sync frame in the recording sector.

Then, the position/width setting device 104 generates a sync gate signal Ssg3 to be "HIGH" for a predetermined short period from the timing when the counting signal Scnt becomes "HIGH" (that is, the timing of starting one sync frame), and outputs the same to the sector lead gate generator 105, a timing setting device 106, and an AND circuit 107. The predetermined short period is equal to the period wherein only the pulses of the prepit signal Spp corresponding to the prepits 4 to be detected in the period corresponding to the synchronization information SY (in general, the period wherein the synchronization information SY is detected).

Since the sync gate signal Ssg3 is generated independently from the prepit signal Spp as mentioned above, the sync gate signal Ssg3 can be a signal capable of accurately indicating the period wherein the prepits 4 are to be detected, even when the prepits 4 are not detected due to the flaw on the DVD-R/W1 or the recording information already recorded on the DVD-R/W1.

Then, the sector lead gate generator 105 latches the final sync number signal Sln by the sync gate signal Ssg3 based on the final sync number signal Sln and the sync gate signal Ssg3, thereby generates a sector lead gate signal Sstg, and outputs the same to the timing setting device 106. The sector lead gate signal Sstg is a signal to change from "LOW" to "HIGH" at the timing when the sync gate signal Ssg3 becomes "HIGH" in the period wherein the final sync number signal Sin is "HIGH", and maintains the "HIGH" state for the period corresponding to one sync frame (see the sixth row from above in FIG. 17).

According to the process, the sync gate signal Ssg3 generated in the period wherein the sector lead gate signal Sstg is "HIGH" is the sync gate signal Ssg3 showing the top of one recording sector.

The inverter 110 in the timing setting device 106 inverts the re-sync enable signal Srse so as to generate an inversion signal Siv, and outputs the same to one of the input terminals of the AND circuits 111.

Accordingly, the AND circuit 111 generates a sector lead timing signal Sstp to be "HIGH" only when all of the inversion signal Siv, the sync gate signal Ssg3, the sector lead gate signal Sstg and the push-pull signal Spp, and outputs the same to the calculator 112. According to the process, the sector lead timing signal Sstp shows the timing when the prepit signal Spp corresponding to the synchronization information SY in the top sync frame in one recording sector.

Then, the calculator 112 starts counting of a reference clock (not illustrated) from the timing when the inputted sync gate signal Ssg3 becomes "HIGH" whenever the sector lead timing signal Sstp is inputted (that is, whenever the top of each recording sector is detected). The calculator 112 finishes the counting operation when the prepit signal Spp is detected in the sync gate signal Ssg3, and accumulates the counting result (shown by the numerals n1 and n2 in the third row from below in FIG. 17). The calculator 112 repeats the operation. In the case the prepit signal Spp included in the sync gate signal Ssg3 is not detected by the influence of the pit showing the synchronization information SY formed in the vicinity thereof, the counting process is not executed. The calculator 112 further repeats the operation of adding the new counting value calculated whenever the counting process is finished to the average value of the counting value until then so as to obtain the average value. The calculator 112 generates a calculating value signal Smv showing the newly calculated average value, and outputs the same to the generator 113.

According to the process, the average value m shown by the calculating value signal Smv provides the latest average value showing the positional relationship between the sync gate signal Ssg3 corresponding to the top of each recording sector and the prepit signal Spp corresponding to the sync gate signal Ssg3. Specifically, this is the amount of time lag between both signals. The latest average value m showing the positional relationship is the most certain value showing the time relationship between the sync gate signal Ssg3 at the top of each recording sector and the prepit signal Spp.

Then, the generator 113 generates a second starting signal Sstt2 when incoming of the timing of the top of the ECC block to start the recording data Sr is indicated by the designation signal Srt, and outputs the same to one of the input terminals of the switch SW2. The second starting signal Sstt2 is a signal to become "HIGH" after the timing when the time corresponding to the average value m shown by the calculating value signal Smv is passed from the timing when the sync gate signal Ssg3 inputted immediately after the change of the designation signal Srt to "HIGH" is changed to "HIGH" (see the lowermost row in FIG. 17).

Generation of the designation signal Srt will be explained. When the user operates the operating section (not illustrated) provided in the information recording apparatus S so as to output a recording starting command, the CPU 14 recognizes the recording position on the DVD-R/W1 for recording the first ECC block of the recording data Sr to be recorded. Then, the CPU 14 confirms detection of the address showing the recording sector prior to the address on the DVD-R/W1 corresponding to the recording position (hereinafter the address is referred to as the "address N") by two. The confirmation operation is realized according to reference to the address signal Sadd. Then, the CPU 14 generates a signal to change from "LOW" to "HIGH" during the period corresponding to the recording sector prior to the address N by one, and outputs the same to the generator 113 as the designation signal Srt. The timing of the change of the designation signal Srt to "HIGH" is preferably a timing as early as possible in the period corresponding to the recording sector prior to the address N by one.

On the other hand, at the same time, the AND circuit 107 generates a signal to become "HIGH" at the timing when both sync gate signal Ssg3 and prepit signal Spp become "HIGH", and outputs the same to one of the input terminals of the switch SW2 as the extraction push-pull signal Sgtp. Accordingly, the extraction prepit signal Sgtp as the prepit signal Spp corresponding more certainly to the top prepit 4 in each sync frame can be generated based on the reproduction. RF signal Srf.

As heretofore explained, according to the operation of the information recording apparatus S of this embodiment, since the recording starting timing of the recording data Sr for overwrite recording process is set based on the synchronization information SY in the recording information already recorded, even in the case the prepit signal Spp is not detected from the DVD-R/W1 wherein the recording information is already recorded, the recording operation of the recording data Sr can be started with the recording starting timing set accurately.

Moreover, since the recording starting timing is predicted and set based on the sync gate signal Ssg3 including the timing for detecting the prepit signal Spp and the prepit signal Spp already detected in recording the recording data Sr for the overwrite recording process, the recording starting timing can be set more accurately.

Furthermore, since the sync gate signal Ssg3 is generated b comparison between the counting result by the free run counter 103 and the threshold value TH preliminarily set, the recording starting timing can be set by generating the sync gate signal Ssg3 with a simple configuration.

Sill further, since the timing setting device 106 sets the timing for starting recording the ECC block in the recording data Sr, the recording starting timing can be set accurately per ECC block.

Moreover, in both cases of overwrite recording of the recording data Sr in the DVD-R/W1 wherein the recording information is already recorded and of addition recording of the recording data Sr in the DVD-R/W1 wherein the recording information is not recorded, the recording operation can be started with the recording starting position corresponding to the recording data Sr for the overwrite recording process or the new addition recording process accurately set even in the case the prepit signal Spp showing the top of the sync frame is not detected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-374414 filed on Dec. 28, 1998 including the specification, claims, drawings and summary is incorporated herein by reference in its entirety.

What is claimed is:

1. An apparatus for setting a recording start timing for recording first recording information onto a recording medium on the basis of a plurality of synchronization signals, the plurality of synchronization signals being recorded on the recording medium in advance, the apparatus comprising:

a first detecting device which detects the plurality of synchronization signals and generates a detection signal indicating detection timings of the plurality of synchronization signals;

a second detecting device which detects synchronization information included in second recording information, the second recording information being later acquired onto the recording medium;

a generating device which generates a timing signal for predicting the detection timings of the plurality of synchronization signals, on the basis of the synchronization information detected by the second detecting device; and a timing control device which sets the recording start timing by using the timing signal when the synchronization signals are not detected by the first detecting device.

2. The apparatus according to claim 1, wherein the generating device comprises:

a gate signal generating device which generates a gate signal for predicting the detection timings of the plurality of synchronization signals, on the basis of the synchronization information detected by the second detecting device; and a timing signal generating device which generates the timing signal by using the gate signal and the detection signal.

3. The apparatus according to claim 2, wherein the gate signal generating device generates the gate signal including a gate pulse and comprises:

a counting device that serves as a counter;

a counting value of the counting device is initialized each time the synchronization information is detected, and the counting device outputs the gate pulse when the counting value coincides with the predetermined value, so that the gate signal including the gate pulse is generated.

4. The apparatus according to claim 1, wherein the recording start timing is a recording start timing of an information block including a predetermined number of information units.

5. The apparatus according to claim 4, wherein the recording medium is a DVD-R/W (DVD-Rewritable), each of the plurality of information units is a sync frame in the DVD-R/W, and the information block is an ECC block in the DVD-R/W.

6. An apparatus for recording first recording information onto a recording medium on the basis of a plurality of synchronization signals, the plurality of synchronization signals being recorded on the recording medium in advance, the apparatus comprising:

a timing setting device which sets a recording start timing for recording the first recording information onto the recording medium;

a reproduction device which reproduces second recording information recorded on the recording medium, the second recording information being later acquired onto the recording medium; and a recording device which records the first recording information onto the recording medium in accordance with the recording start timing, wherein the timing setting device comprises:

a first detecting device which detects the plurality of synchronization signals and generates a detection signal indicating detection timings of the plurality of synchronization signals;

a second detecting device which detects synchronization information included in the second recording information;

a generating device which generates a timing signal for predicting the detection timings of the plurality of synchronization signals, on the basis of the synchronization information detected by the second detecting device; and a timing control device which sets the recording start timing by using the timing signal when the synchronization signals are not detected by the first detecting device.

7. The apparatus according to claim 6, wherein the generating device comprises:

a gate signal generating device which generates a gate signal for predicting the detection timings of the plurality of synchronization signals, on the basis of the synchronization information detected by the second detecting device; and a timing signal generating device which generates the timing signal by using the gate signal and the detection signal.

8. The apparatus according to claim 7, wherein the gate signal generating device generates the gate signal including a gate pulse and comprises:

a counting device that serves as a counter;

a counting value of the counting device is initialized each time the synchronization information is detected, and the counting device outputs the gate pulse when the counting value coincides with the predetermined value, so that the gate signal including the gate pulse is generated.

9. The apparatus according to claim 6, wherein the recording start timing is a recording start timing of an information block including a predetermined number of information units.

10. The apparatus according to claim 9, wherein the recording medium is a DVD-R/W (DVD-Rewritable), each of the plurality of information units is a sync frame in the DVD-R/W, and the information block is an ECC block in the DVD-R/W.

11. An apparatus for setting a recording start timing for recording first recording information onto a recording medium on the basis of a plurality of synchronization signals, the plurality of synchronization signals being recorded on the recording medium in advance, the apparatus comprising:

an overwrite recording section which sets an overwrite recording start timing for recording the first recording information onto the recording medium on which second recording information is previously recorded, the second recording information being later acquired onto the recording medium;

an addition recording section which sets an addition recording start timing for recording the first recording information onto the recording medium on which the second recording information is not recorded; and a selecting device which selects one of the overwrite recording start timing and the addition recording start timing on the basis of whether or not the second recording information is previously recorded on the recording medium, wherein the addition recording section comprises:

a first detecting device which detects the plurality of synchronization signals and generates a detection signal indicating detection timings of the plurality of synchronization signals;

a first generating device which generates a first timing signal on the basis of the detection signal; and a first timing control device which sets the addition recording start timing by using the first timing signal, and the overwrite recording section comprises:

a second detecting device which detects synchronization information included in the second recording information recorded on the recording medium;

a second generating device which generates a second timing signal for predicting the detection timings of the plurality of synchronization signals, on the basis of the synchronization information detected by the second detecting device; and a second timing control device which sets the overwrite recording start timing by using the second timing signal.

12. The apparatus according to claim 11, wherein the first generating device comprises:

a specific synchronization signal detecting device which detects a specific synchronization signal from the detection signal, the specific synchronization signal being one of the plurality of synchronization signals; and a timing prediction device which predicts the detection timings of the plurality of synchronization signals, on the basis of the specific synchronization signal detected by the specific synchronization signal detecting device.

13. The apparatus according to claim 11, wherein the selecting device includes a third detecting device which detects whether or not the second recording information is previously recorded on the recording medium.

* * * * *